US012503478B2

(12) United States Patent
Bertin et al.

(10) Patent No.: US 12,503,478 B2
(45) Date of Patent: *Dec. 23, 2025

(54) ORGANOSILANE COMPOUNDS AND METHODS OF MAKING AND USING THE SAME

(71) Applicant: Wilmar Trading Pte. Ltd., Singapore (SG)

(72) Inventors: Paul A. Bertin, Western Springs, IL (US); Charles E. Coburn, Vernon Hills, IL (US)

(73) Assignee: Wilmar Trading Pte. Ltd., Singapore (SG)

( * ) Notice: Subject to any disclaimer, the term of this patent is extended or adjusted under 35 U.S.C. 154(b) by 365 days.

This patent is subject to a terminal disclaimer.

(21) Appl. No.: 17/528,255

(22) Filed: Nov. 17, 2021

(65) Prior Publication Data

US 2022/0073544 A1 Mar. 10, 2022

Related U.S. Application Data

(63) Continuation of application No. 16/508,535, filed on Jul. 11, 2019, now Pat. No. 11,225,494.

(60) Provisional application No. 62/772,929, filed on Nov. 29, 2018, provisional application No. 62/697,522, filed on Jul. 13, 2018.

(51) Int. Cl.
C07F 7/18 (2006.01)

(52) U.S. Cl.
CPC .................................. C07F 7/1876 (2013.01)

(58) Field of Classification Search
CPC .................................................. C07F 7/1876
See application file for complete search history.

(56) References Cited

U.S. PATENT DOCUMENTS

| | | | | |
|---|---|---|---|---|
| 2,738,290 A * | 3/1956 | Janes | ............... | D06M 15/6436 |
| | | | | 8/115.64 |
| 3,369,036 A | 2/1968 | Miller | | |
| 4,767,599 A * | 8/1988 | Mohr | ....................... | C09K 5/20 |
| | | | | 252/75 |
| 4,855,470 A * | 8/1989 | Panster | ................. | C07F 7/1804 |
| | | | | 556/421 |
| 5,103,000 A * | 4/1992 | Akiyama | ............... | B01J 20/286 |
| | | | | 546/14 |
| 8,425,778 B2 * | 4/2013 | Liu | ........................ | B01J 20/289 |
| | | | | 210/656 |
| 9,314,712 B2 | 4/2016 | Liu et al. | | |
| 9,822,326 B2 | 11/2017 | Patil et al. | | |
| 11,225,494 B2 * | 1/2022 | Bertin | ................... | C07F 7/1876 |
| 2006/0054559 A1 | 3/2006 | Liu et al. | | |
| 2010/0252096 A1 * | 10/2010 | Ogawa | .............. | H01L 21/02628 |
| | | | | 257/E31.119 |
| 2012/0174823 A1 | 7/2012 | Ham et al. | | |
| 2013/0155340 A1 | 6/2013 | Clapp et al. | | |
| 2014/0050917 A1 | 2/2014 | Upadhyaya et al. | | |
| 2016/0010241 A1 | 1/2016 | Shin et al. | | |
| 2018/0019462 A1 | 1/2018 | Kadoma et al. | | |

FOREIGN PATENT DOCUMENTS

| | | | | |
|---|---|---|---|---|
| CN | 103066323 | | 4/2013 | |
| EP | 59308 A | * | 9/1982 | .......... B41M 5/3825 |
| JP | 02275414 A | * | 9/1990 | |
| JP | 02275414 | | 11/1990 | |
| JP | 2003234021 | | 8/2003 | |
| KR | 20160115149 | | 10/2016 | |
| SU | 846546 | | 7/1981 | |
| SU | 846546 A1 | * | 7/1981 | |
| WO | 2004005587 A2 | | 1/2004 | |
| WO | 2009075040 | | 6/2009 | |
| WO | WO-2013024678 A1 | * | 2/2013 | ............ C07F 7/1836 |
| WO | 2018124968 | | 7/2018 | |

OTHER PUBLICATIONS

R. Cohen et al., 31 Langmuir, 3049-3058 (2015) (Year: 2015).*
C. Hoffmann et al., 295 Journal of Colloid and Interface Science, 427-435 (2006) (Year: 2006).*
J. Smith et al., 10 Journal of Materials Chemistry, 1765-1769 (2000) (Year: 2000).*
CAS Abstract and Indexed Compound H. Kobayashi et al., JP 02275414 (1990) (Year: 1990).*
CAS Abstract and Indexed Compound R. Calas et al., 3 Revue Francaise des Corps Gras, 5-9 (1956) (Year: 1956).*
R. Dappen et al., 464 Journal of Chromatography, 39-47 (1989) (Year: 1989).*
A. Dobashi et al., 60 Analytical Chemistry, 1985-1987 (1988) (Year: 1988).*
CAS Abstract and Indexed Compounds A. Aviram et al., EP 0059308 (1982) (Year: 1982).*
CAS Abstract and Indexed Compounds J. Janes, U.S. Pat. No. 2,738,290 (1956) (Year: 1956).*
Cheng et al., "Polysilylether: A Degradable Polymer from Biorenewable Feedstocks", Angewandte Chemie, Wiley—VCH Verlag GmbH & Co. KGAA, vol. 128, No. 39, Sep. 2, 2016, pp. 12051-12055.
Application No. EP19835061.3, Extended European Search Report dated Mar. 29, 2022, 10 pages.
Michael et al., "Epoxy-Terminated Self-Assembled Monolayers Containing Internal Urea or Amide Groups", Langmuir, vol. 31, No. 9, Feb. 24, 2015, pp. 2783-2789.

(Continued)

*Primary Examiner* — Alexander R Pagano

(74) *Attorney, Agent, or Firm* — Kilpatrick Townsend & Stockton LLP

(57) ABSTRACT

Silane compounds derived from medium-chain fatty acids are generally disclosed herein. Methods of using such compounds, for example, as compatibilizing agents, are also disclosed herein, as well as methods of making such compounds, for example, from medium-chain fatty acids derived from natural oils.

6 Claims, 1 Drawing Sheet

(56) References Cited

OTHER PUBLICATIONS

Bayer, et al., "Characterization of Chemically Modified Silica Gels by Silicon-29and Carbon-13 Cross-polarization and Magic Angle Spinning Nuclear Magnetic Resonance", Journal of Chromatography, vol. 264, No. 2, 1983, pp. 197-213.
EP19835061.3, "Office Action", Mar. 26, 2025, 7 pages.
Yoshida, et al., "Conformational and Orientational Behavior of Functional Polysilanes at the Air/Water Interface", Molecular Crystals and Liquid Crystals Science and Technology. Section a, Molecular Crystals and Liquid Crystals, vol. 322, No. 1, Nov. 1, 1998, pp. 135-140.
Zhai, et al., "Synthesis of Poly(Silyl Ethers) via Iridium-catalyzed Dehydrocoupling Polymerization", Organometallics, vol. 37, No. 14, Jul. 12, 2018.
U.S. Appl. No. 16/508,535, Non-Final Office Action, dated Jan. 29, 2021, 13 pages.
U.S. Appl. No. 16/508,535, Non-Final Office Action dated On Jul. 9, 2021, 7 pages.
U.S. Appl. No. 16/508,535, Notice of Allowance dated Sep. 29, 2021, 10 pages.
Alon et al., "Direct Observation of Patterned Self-Assembled Monolayers and Bilayers on Silica-on-Silicon Surfaces", Optical Materials Express, vol. 5, No. 1, 2015, pp. 149-162.
Cohen et al., "Carboxylic Acid Decorated Self-Assembled Monolayer Films: New Acid Synthesis Chemistry and Reaction Chemistry Including Bridged Diacyl Peroxide Preparation", Langmuir, vol. 31, No. 10, 2015, pp. 3049-3058.
Hoffmann et al., "Mixed Self-Assembled Monolayers (Sams) Consisting of Methoxy-Tri(Ethylene Glycol)-Terminated and Alkyl-Terminated Dimethylchlorosilanes Control the Non-Specific Adsorption of Proteins at Oxidic Surfaces", Journal of Colloid and Interface Science, vol. 295, 2006, pp. 427-435.
Kitaev et al., "Mixed Monolayers Self-Assembled on Mica Surface", Langmuir, vol. 17, 2001, pp. 4274-4281.
Application No. PCT/US2019/041291, International Preliminary Report on Patentability, Mailed On Jan. 28, 2021, 16 pages.
Application No. PCT/US2019/041291, International Search Report and Written Opinion, Mailed On Oct. 29, 2019, 13 pages.
Smith et al., "Synthesis of Model Organosiloxanes Containing Perfluoroether Side-Chains", Journal of Materials Chemistry, vol. 10, 2000, pp. 1765-1769.
EP19835061.3, "Office Action", Aug. 4, 2025, 7 pages.
EP19835061.3, "Office Action", Oct. 30, 2025, 6 pages.

\* cited by examiner

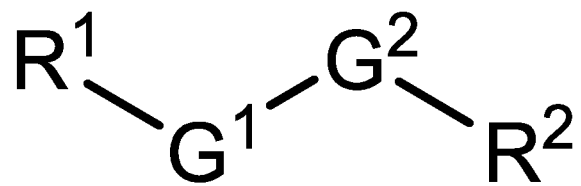

ORGANOSILANE COMPOUNDS AND METHODS OF MAKING AND USING THE SAME

CROSS-REFERENCE TO RELATED APPLICATIONS

The present application is a continuation of U.S. patent application Ser. No. 16/508,535 filed Jul. 11, 2019, which claims the benefit of and priority to U.S. Provisional Application Nos. 62/697,522, filed Jul. 13, 2018, and 62/772,929, filed Nov. 29, 2018, both of which are incorporated by reference herein in their entireties.

TECHNICAL FIELD

Organosilane compounds derived from medium-chain fatty acids are generally disclosed herein. Methods of using such compounds, for example, as compatibilizing agents, are also disclosed herein, as well as methods of making such compounds, for example, from medium-chain fatty acids derived from natural oils.

BACKGROUND

Natural oils, such as seed oils, and their derivatives can provide useful starting materials for making a variety of chemical compounds. Because such compounds contain a certain degree of inherent functionality that is otherwise absent from petroleum-sourced materials, it can often be more desirable, if not cheaper, to use natural oils or their derivatives as a starting point for making certain compounds. Additionally, natural oils and their derivatives are generally sourced from renewable feedstocks. Thus, by using such starting materials, one can enjoy the concomitant advantage of developing useful chemical products without consuming limited supplies of petroleum. Further, refining natural oils can be less intensive in terms of the severity of the conditions required to carry out the refining process.

Natural oils can be refined in a variety of ways. For example, processes that rely on microorganisms can be used, such as fermentation. Chemical processes can also be used. For example, when the natural oils contain at least one carbon-carbon double bond, olefin metathesis can provide a useful means of refining a natural oil and making useful chemicals from the compounds in the feedstock.

Metathesis is a catalytic reaction that involves the interchange of alkylidene units among compounds containing one or more double bonds (e.g., olefinic compounds) via the cleavage and formation of carbon-carbon double bonds. Metathesis may occur between two like molecules (often referred to as "self-metathesis") or it may occur between two different molecules (often referred to as "cross-metathesis"). Self-metathesis may be represented schematically as shown below in Equation (A):

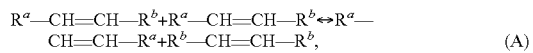

wherein $R^a$ and $R^b$ are organic groups.

Cross-metathesis may be represented schematically as shown below in Equation (B):

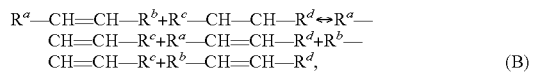

wherein $R^a$, $R^b$, $R^c$, and $R^d$ are organic groups. Self-metathesis will also generally occur concurrently with cross-metathesis.

In recent years, there has been an increased demand for environmentally friendly techniques for manufacturing materials typically derived from petroleum sources, which can be made by processes that involve olefin metathesis. This has led to studies of the feasibility of manufacturing biofuels, waxes, plastics, and the like, using natural oil feedstocks, such as vegetable and/or seed-based oils.

Natural oil feedstocks of interest include, but are not limited to, oils such as natural oils (e.g., vegetable oils, fish oils, algae oils, and animal fats), and derivatives of natural oils, such as free fatty acids and fatty acid alkyl (e.g., methyl) esters. These natural oil feedstocks may be converted into industrially useful chemicals (e.g., waxes, plastics, cosmetics, biofuels, etc.) by any number of different metathesis reactions. Significant reaction classes include, as non-limiting examples, self-metathesis, cross-metathesis with olefins, and ring-opening metathesis reactions. Non-limiting examples of useful metathesis catalysts are described in further detail below.

Refining processes for natural oils (e.g., employing metathesis) can lead to compounds having chain lengths closer to those generally desired for chemical intermediates of specialty chemicals (e.g., about 9 to 15 carbon atoms). By using these compounds as starting materials, it is possible to create a variety of novel chemical compounds that may be used for a variety of useful purposes.

Meanwhile, generating functional silane compounds having such chain lengths can pose certain problems, especially if there is a desire to vary the properties of the compound by easily varying the functionality of the non-silane end of the compound. Instead, users are often forced to employ silane coupling agents that fail to provide ideal coating of certain fill materials, which therefore leads to reinforced articles having reduced performance characteristics in comparison to what is desired.

Thus, there is a continuing need to develop solvent compounds and compositions that are renewably sourced, and can serve as suitable compounds for making a series of silane coupling agents.

SUMMARY

The present disclosure provides novel silane coupling agents that are derived from renewable sources and that are built from difunctional building blocks that are easy to modify at the non-silane end of the compound.

In a first aspect, the disclosure provides compounds of formula (I):

wherein: $G^1$ is —$(CH_2)_9$—, —$(CH_2)_{10}$—, or —$(CH_2)_{11}$—; $G^2$ is —$CH_2$— or $C(O)$; $R^1$ is an organosilane moiety; $R^2$ is —O—$R^3$, —NH—$R^4$, or —N($R^6$)($R^7$); $R^3$, $R^4$, $R^6$, and $R^7$ are independently $C_{1-12}$ alkyl, $C_{2-12}$ alkenyl, or $C_{1-101}$ heteroalkyl, each of which is optionally substituted one or more times by substituents selected independently from Rx, and Rx is a halogen atom, —OH, —$NH_2$, $C_{1-6}$ alkyl, $C_{2-6}$ alkenyl, $C_{1-12}$ heteroalkyl, or $C_{6-14}$ aryl, wherein any two-OH substituents on immediately adjacent carbon atoms may optionally combine to form an epoxy group, and wherein $R^6$ and $R^7$ may optionally combine to form a ring.

In a second aspect, the disclosure provides sizing (or coating) composition for a matrix reinforcement material, the sizing composition comprising one or more compounds of the first aspect or any embodiments thereof.

In a third aspect, the disclosure provides methods of coating a matrix reinforcement material, the method comprising: providing a matrix reinforcement material and a sizing composition of the second aspect or any embodiments thereof; and contacting the matrix reinforcement material with the sizing composition.

In a fourth aspect, the disclosure provides coated matrix reinforcement materials, comprising a matrix reinforcement material, wherein at least a portion of the surface of the matrix reinforcement material comprises one or more compounds of the first aspect or any embodiments thereof.

In a fifth aspect, the disclosure provides methods of forming a reinforced polymer material, comprising: providing a polymer material; and introducing into the polymer material one or more coated matrix reinforcement materials of the fourth aspect or any embodiments thereof.

In a sixth aspect, the disclosure provides reinforced articles, the articles comprising a matrix material and one or more coated matrix reinforcement materials of the fourth aspect or any embodiments thereof.

Further aspects and embodiments are provided in the foregoing drawings, detailed description and claims.

BRIEF DESCRIPTION OF THE DRAWINGS

The following drawings are provided for purposes of illustrating various embodiments of the compositions and methods disclosed herein. The drawings are provided for illustrative purposes only, and are not intended to describe any preferred compositions or preferred methods, or to serve as a source of any limitations on the scope of the claimed inventions.

The FIGURE shows a non-limiting example of a compound made according to certain embodiments disclosed herein, wherein: wherein: $G^1$ is —$(CH_2)_9$—, —$(CH_2)_{10}$—, or —$(CH_2)_{11}$—: $G^2$ is —$CH_2$— or $C(O)$; $R^1$ is an organosilane moiety: $R^2$ is —O—$R^3$, —NH—$R^4$, or —$N(R^6)(R^7)$; $R^3$, $R^4$, $R^6$, and $R^7$ are independently $C_{1-12}$ alkyl, $C_{2-12}$ alkenyl, or $C_{1-101}$ heteroalkyl, each of which is optionally substituted one or more times by substituents selected independently from RY, and Rx is a halogen atom, —OH, —$NH_2$, $C_{1-6}$ alkyl, $C_{2-6}$ alkenyl, $C_{1-12}$ heteroalkyl, or $C_{6-14}$ aryl, wherein any two-OH substituents on immediately adjacent carbon atoms may optionally combine to form an epoxy group, and wherein $R^6$ and $R^7$ may optionally combine to form a ring.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure, and are not meant to be limiting in any fashion. Nor do these phrases indicate any kind of preference for the disclosed embodiment.

As used herein, "natural oil," "natural feedstock," or "natural oil feedstock" refer to oils derived from plants or animal sources. These terms include natural oil derivatives, unless otherwise indicated. The terms also include modified plant or animal sources (e.g., genetically modified plant or animal sources), unless indicated otherwise. Examples of natural oils include, but are not limited to, vegetable oils, algae oils, fish oils, animal fats, tall oils, derivatives of these oils, combinations of any of these oils, and the like. Representative non-limiting examples of vegetable oils include rapeseed oil (canola oil), coconut oil, corn oil, cottonseed oil, olive oil, palm oil, peanut oil, safflower oil, sesame oil, soy bean oil, sunflower oil, linseed oil, palm kernel oil, tung oil, jatropha oil, mustard seed oil, pennycress oil, camelina oil, hempseed oil, and castor oil. Representative non-limiting examples of animal fats include lard, tallow, poultry fat, yellow grease, and fish oil. Tall oils are by-products of wood pulp manufacture. In some embodiments, the natural oil or natural oil feedstock comprises one or more unsaturated glycerides (e.g., unsaturated triglycerides). In some such embodiments, the natural oil feedstock comprises at least 50% by weight, or at least 60% by weight, or at least 70% by weight, or at least 80% by weight, or at least 90% by weight, or at least 95% by weight, or at least 97% by weight, or at least 99% by weight of one or more unsaturated triglycerides, based on the total weight of the natural oil feedstock.

As used herein, "natural oil derivatives" refers to the compounds or mixtures of compounds derived from a natural oil using any one or combination of methods known in the art. Such methods include but are not limited to saponification, fat splitting, transesterification, esterification, hydrogenation (partial, selective, or full), isomerization, oxidation, and reduction. Representative non-limiting examples of natural oil derivatives include gums, phospholipids, soapstock, acidulated soapstock, distillate or distillate sludge, fatty acids and fatty acid alkyl ester (e.g. non-limiting examples such as 2-ethylhexyl ester), hydroxy substituted variations thereof of the natural oil. For example, the natural oil derivative may be a fatty acid methyl ester ("FAME") derived from the glyceride of the natural oil. In some embodiments, a feedstock includes canola or soy bean oil, as a non-limiting example, refined, bleached, and deodorized soy bean oil (i.e., RBD soy bean oil). Soy bean oil typically comprises about 95% weight or greater (e.g., 99% weight or greater) triglycerides of fatty acids. Major fatty acids in the polyol esters of soybean oil include saturated fatty acids, as a non-limiting example, palmitic acid (hexadecanoic acid) and stearic acid (octadecanoic acid), and unsaturated fatty acids, as a non-limiting example, oleic acid (9)-octadecenoic acid), linoleic acid (9,12-octadecadienoic acid), and linolenic acid (9,12,15-octadecatrienoic acid).

As used herein, "metathesis catalyst" includes any catalyst or catalyst system that catalyzes an olefin metathesis reaction.

As used herein, "metathesize" or "metathesizing" refer to the reacting of a feedstock in the presence of a metathesis catalyst to form a "metathesized product" comprising new olefinic compounds, i.e., "metathesized" compounds. Metathesizing is not limited to any particular type of olefin metathesis, and may refer to cross-metathesis (i.e., co-metathesis), self-metathesis, ring-opening metathesis, ring-opening metathesis polymerizations ("ROMP"), ring-closing metathesis ("RCM"), and acyclic diene metathesis ("ADMET"). In some embodiments, metathesizing refers to reacting two triglycerides present in a natural feedstock (self-metathesis) in the presence of a metathesis catalyst, wherein each triglyceride has an unsaturated carbon-carbon double bond, thereby forming a new mixture of olefins and esters which may include a triglyceride dimer. Such triglyceride dimers may have more than one olefinic bond, thus higher oligomers also may form. Additionally, in some other embodiments, metathesizing may refer to reacting an olefin, such as ethylene, and a triglyceride in a natural feedstock having at least one unsaturated carbon-carbon double bond, thereby forming new olefinic molecules as well as new ester molecules (cross-metathesis).

As used herein, "olefin" or "olefins" refer to compounds having at least one unsaturated carbon-carbon double bond. In certain embodiments, the term "olefins" refers to a group of unsaturated carbon-carbon double bond compounds with different carbon lengths. Unless noted otherwise, the terms "olefin" or "olefins" encompasses "polyunsaturated olefins" or "poly-olefins," which have more than one carbon-carbon double bond. As used herein, the term "monounsaturated olefins" or "mono-olefins" refers to compounds having only one carbon-carbon double bond. A compound having a terminal carbon-carbon double bond can be referred to as a "terminal olefin," while an olefin having a non-terminal carbon-carbon double bond can be referred to as an "internal olefin."

As used herein, the term "low-molecular-weight olefin" may refer to any one or combination of unsaturated straight, branched, or cyclic hydrocarbons in the $C_{2-14}$ range. Low-molecular-weight olefins include "alpha-olefins" or "terminal olefins," wherein the unsaturated carbon-carbon bond is present at one end of the compound. Low-molecular-weight olefins may also include dienes or trienes. Low-molecular-weight olefins may also include internal olefins or "low-molecular-weight internal olefins." In certain embodiments, the low-molecular-weight internal olefin is in the $C_{4-14}$ range. Examples of low-molecular-weight olefins in the $C_{2-6}$ range include, but are not limited to: ethylene, propylene, 1-butene, 2-butene, isobutene, 1-pentene, 2-pentene, 3-pentene, 2-methyl-1-butene, 2-methyl-2-butene, 3-methyl-1-butene, cyclopentene, 1,4-pentadiene, 1-hexene, 2-hexene, 3-hexene, 4-hexene, 2-methyl-1-pentene, 3-methyl-1-pentene, 4-methyl-1-pentene, 2-methyl-2-pentene, 3-methyl-2-pentene, 4-methyl-2-pentene, 2-methyl-3-pentene, and cyclohexene. Non-limiting examples of low-molecular-weight olefins in the $C_{7-9}$ range include 1,4-heptadiene, 1-heptene, 3,6-nonadiene, 3-nonene, 1,4,7-octatriene. Other possible low-molecular-weight olefins include styrene and vinyl cyclohexane. In certain embodiments, it is preferable to use a mixture of olefins, the mixture comprising linear and branched low-molecular-weight olefins in the $C_{4-10}$ range. In one embodiment, it may be preferable to use a mixture of linear and branched $C_4$ olefins (i.e., combinations of: 1-butene, 2-butene, and/or isobutene). In other embodiments, a higher range of $C_{11-14}$ may be used.

In some instances, the olefin can be an "alkene," which refers to a straight- or branched-chain non-aromatic hydrocarbon having 2 to 30 carbon atoms and one or more carbon-carbon double bonds, which may be optionally substituted, as herein further described, with multiple degrees of substitution being allowed. A "monounsaturated alkene" refers to an alkene having one carbon-carbon double bond, while a "polyunsaturated alkene" refers to an alkene having two or more carbon-carbon double bonds. A "lower alkene," as used herein, refers to an alkene having from 2 to 10 carbon atoms.

As used herein, "alpha-olefin" refers to an olefin (as defined above) that has a terminal carbon-carbon double bond. In some embodiments, the alpha-olefin is a terminal alkene, which is an alkene (as defined above) having a terminal carbon-carbon double bond. Additional carbon-carbon double bonds can be present.

As used herein, "ester" or "esters" refer to compounds having the general formula: R—COO—R', wherein R and R' denote any organic group (such as alkyl, aryl, or silyl groups) including those bearing heteroatom-containing substituent groups. In certain embodiments, R and R' denote alkyl, alkenyl, aryl, or alcohol groups. In certain embodiments, the term "esters" may refer to a group of compounds with the general formula described above, wherein the compounds have different carbon lengths. In certain embodiments, the esters may be esters of glycerol, which is a trihydric alcohol. The term "glyceride" can refer to esters where one, two, or three of the —OH groups of the glycerol have been esterified.

It is noted that an olefin may also comprise an ester, and an ester may also comprise an olefin, if the R or R' group in the general formula R—COO—R' contains an unsaturated carbon-carbon double bond. Such compounds can be referred to as "unsaturated esters" or "olefin esters." Further, a "terminal olefin ester" may refer to an ester compound where R has an olefin positioned at the end of the chain. An "internal olefin ester" may refer to an ester compound where R has an olefin positioned at an internal location on the chain. Additionally, the term "terminal olefin" may refer to an ester or an acid thereof where R' denotes hydrogen or any organic compound (such as an alkyl, aryl, or silyl group) and R has an olefin positioned at the end of the chain, and the term "internal olefin" may refer to an ester or an acid thereof where R' denotes hydrogen or any organic compound (such as an alkyl, aryl, or silyl group) and R has an olefin positioned at an internal location on the chain.

As used herein, "alkyl" refers to a straight or branched chain saturated hydrocarbon having 1 to 30 carbon atoms, which may be optionally substituted, as herein further described, with multiple degrees of substitution being allowed. Examples of "alkyl," as used herein, include, but are not limited to, methyl, ethyl, n-propyl, isopropyl, isobutyl, n-butyl, sec-butyl, tert-butyl, isopentyl, n-pentyl, neopentyl, n-hexyl, and 2-ethylhexyl. The number of carbon atoms in an alkyl group is represented by the phrase "$C_{x-y}$ alkyl," which refers to an alkyl group, as herein defined, containing from x to y, inclusive, carbon atoms. Thus, "$C_{1-6}$ alkyl" represents an alkyl chain having from 1 to 6 carbon atoms and, for example, includes, but is not limited to, methyl, ethyl, n-propyl, isopropyl, isobutyl, n-butyl, sec-butyl, tert-butyl, isopentyl, n-pentyl, neopentyl, and n-hexyl. In some instances, the "alkyl" group can be divalent, in which case the group can alternatively be referred to as an "alkylene" group. Also, in some instances, one or more of the carbon atoms in the alkyl or alkylene group can be replaced by a heteroatom (e.g., selected from nitrogen, oxygen, or sulfur, including quaternary nitrogen atoms, N-oxides, sulfur oxides, and sulfur dioxides, where feasible), and is referred to as a "heteroalkyl" or "heteroalkylene" group, respectively. Non-limiting examples include "oxyalkyl" or "oxyalkylene" groups, which are groups of the following formulas: -[-(alkylene)-O-]$_v$-alkyl, or -[-(alkylene)-O-]$_v$-alkylene-, respectively, where v is 1 or more, such as 1, 2, 3, 4, 5, 6, 7, 8, 9, 10, 11, 12, 13, 14, 15, 16, 17, 18, 19, 20, or the like.

As used herein, "alkenyl" refers to a straight or branched chain non-aromatic hydrocarbon having 2 to 30 carbon atoms and having one or more carbon-carbon double bonds, which may be optionally substituted, as herein further described, with multiple degrees of substitution being allowed. Examples of "alkenyl," as used herein, include, but are not limited to, ethenyl, 2-propenyl, 2-butenyl, and 3-butenyl. The number of carbon atoms in an alkenyl group is represented by the phrase "$C_{x-y}$ alkenyl," which refers to an alkenyl group, as herein defined, containing from x to y, inclusive, carbon atoms. Thus, "$C_{2-6}$ alkenyl" represents an alkenyl chain having from 2 to 6 carbon atoms and, for example, includes, but is not limited to, ethenyl, 2-propenyl, 2-butenyl, and 3-butenyl. In some instances, the "alkenyl" group can be divalent, in which case the group can alternatively be referred to as an "alkenylene" group.

As used herein, "halogen" or "halo" refers to a fluorine, chlorine, bromine, and/or iodine atom. In some embodiments, the terms refer to fluorine or chlorine.

As used herein, "substituted" refers to substitution of one or more hydrogen atoms of the designated moiety with the named substituent or substituents, multiple degrees of substitution being allowed unless otherwise stated, provided that the substitution results in a stable or chemically feasible compound. A stable compound or chemically feasible compound is one in which the chemical structure is not substantially altered when kept at a temperature from about −80° C. to about +40° C., in the absence of moisture or other chemically reactive conditions, for at least a week. As used herein, the phrases "substituted with one or more . . . " or "substituted one or more times . . . " refer to a number of substituents that equals from one to the maximum number of substituents possible based on the number of available bonding sites, provided that the above conditions of stability and chemical feasibility are met.

As used herein, an "organosilane moiety" refers to a moiety having the general structure —Si(R)(R')(R"), wherein R, R', and R" are independently a hydrogen atom, a hydroxyl group, a halogen atom, or an organic group, such as alkyl, aryl, alkoxy, aryloxy, and the like, provided that at least one of R, R', and R" is an organic group.

As used herein, "mix" or "mixed" or "mixture" refers broadly to any combining of two or more compositions. The two or more compositions need not have the same physical state: thus, solids can be "mixed" with liquids, e.g., to form a slurry, suspension, or solution. Further, these terms do not require any degree of homogeneity or uniformity of composition. This, such "mixtures" can be homogeneous or heterogeneous, or can be uniform or non-uniform. Further, the terms do not require the use of any particular equipment to carry out the mixing, such as an industrial mixer.

As used herein, "optionally" means that the subsequently described event(s) may or may not occur. In some embodiments, the optional event does not occur. In some other embodiments, the optional event does occur one or more times.

As used herein, "comprise" or "comprises" or "comprising" or "comprised of" refer to groups that are open, meaning that the group can include additional members in addition to those expressly recited. For example, the phrase, "comprises A" means that A must be present, but that other members can be present too. The terms "include," "have," and "composed of" and their grammatical variants have the same meaning. In contrast, "consist of" or "consists of" or "consisting of" refer to groups that are closed. For example, the phrase "consists of A" means that A and only A is present.

As used herein, "or" is to be given its broadest reasonable interpretation, and is not to be limited to an either/or construction. Thus, the phrase "comprising A or B" means that A can be present and not B, or that B is present and not A, or that A and B are both present. Further, if A, for example, defines a class that can have multiple members, e.g., $A_1$ and $A_2$, then one or more members of the class can be present concurrently.

As used herein, the various functional groups represented will be understood to have a point of attachment at the functional group having the hyphen or dash (-) or an asterisk (*). In other words, in the case of —CH$_2$CH$_2$CH$_3$, it will be understood that the point of attachment is the CH$_2$ group at the far left. If a group is recited without an asterisk or a dash, then the attachment point is indicated by the plain and ordinary meaning of the recited group.

In some instances herein, organic compounds are described using the "line structure" methodology, where chemical bonds are indicated by a line, where the carbon atoms are not expressly labeled, and where the hydrogen atoms covalently bound to carbon (or the C—H bonds) are not shown at all. For example, by that convention, the formula

represents n-propane. In some instances herein, a squiggly bond is used to show the compound can have any one of two or more isomers. For example, the structure

(I)

can refer to (E)-2-butene or (Z)-2-butene.

As used herein, multi-atom bivalent species are to be read from left to right. For example, if the specification or claims recite A-D-E and D is defined as —OC(O)—, the resulting group with D replaced is: A-OC(O)-E and not A-C(O)O-E.

Other terms are defined in other portions of this description, even though not included in this subsection.

Silane Derivatives

In a certain aspects, the disclosure provides compounds of formula (I):

(I)

wherein: $G^1$ is —$(CH_2)_9$—, —$(CH_2)_{10}$—, or —$(CH_2)_{11}$—: $G^2$ is —$CH_2$— or C(O): $R^1$ is an organosilane moiety: $R^2$ is —O—$R^3$, —NH—$R^4$, or —N($R^6$)($R^7$); $R^3$, $R^4$, $R^6$, and $R^7$ are independently $C_{1-12}$ alkyl, $C_{2-12}$ alkenyl, or $C_{1-101}$ heteroalkyl, each of which is optionally substituted one or more times by substituents selected independently from RY, and Rx is a halogen atom, —OH, —$NH_2$, $C_{1-6}$ alkyl, $C_{2-6}$ alkenyl, $C_{1-12}$ heteroalkyl, or $C_{6-14}$ aryl, wherein any two-OH substituents on immediately adjacent carbon atoms may optionally combine to form an epoxy group, and wherein $R^6$ and $R^7$ may optionally combine to form a ring.

In some embodiments, $G^1$ is —$(CH_2)_9$— or —$(CH_2)_{10}$—. In some embodiments, $G^1$ is —$(CH_2)_9$—. For example, in embodiments where the silane compounds are derived from 9-decenoic acid, or an ester thereof, the terminal carbon-carbon double bond is available for silylation. Compounds such as 9-decenoic acid, or an ester thereof, can be formed via the cross-metathesis of a 49 unsaturated fatty acid, or ester thereof, using an alpha-olefin, such as ethylene, propylene, or 1-butene. In some embodiments, $G^1$ is —$(CH_2)_{10}$—. For example, in embodiments where the silane compounds are derived from 10-undecenoic acid, or an ester thereof, the terminal carbon-carbon double bond is available for silylation. Compounds such as 10-undecenoic acid, or an ester thereof, can be formed from the cleavage of ricinoleic acid, or esters thereof. In some embodiments, $G^1$ is —$(CH_2)_{11}$—. For example, in embodiments where the silane compounds are derived from 11-dodecenoic acid, or an ester thereof, the terminal carbon-carbon double bond is available for silylation. Compounds such as 11-dodecenoic acid, or an ester thereof, can be formed from the isomerization of 9-dodecenoic acid, 10-dodecenoic acid, or esters thereof. For each of the these embodiments, one could also use reduced forms, such as alcohols in the form of 9-decen-1-ol, 10-undecen-1-ol, or 11-dodecen-1-ol.

In some embodiments of any of the foregoing embodiments, $G^2$ is a carbonyl group, C(O). These embodiments correspond, for example, to compounds formed from acids or esters. In some other embodiments of any of the foregoing embodiments, $G^2$ is a methylene group, —$CH_2$—. These embodiments correspond, for example, to compounds formed from alcohols.

Any suitable organosilane moiety can be used. In some embodiments of any of the aforementioned embodiments, the organosilane moiety is a moiety of formula (II):

$$—Si(R^{11})(R^{12})(R^{13}) \quad (II)$$

wherein: $R^{11}$, $R^{12}$, and $R_{13}$ are independently a hydrogen atom, a halogen atom, —OH, $C_{1-12}$ alkyl, $C_{6-14}$ aryl, $C_{1-12}$ alkyloxy, or $C_{6-14}$ aryloxy, wherein at least one of $R^{11}$, $R^{12}$, and $R_{13}$ is $C_{1-12}$ alkyl, $C_{6-14}$ aryl, $C_{1-12}$ alkyloxy, or $C_{6-14}$ aryloxy. In some further such embodiments, $R^{11}$, $R^{12}$, and $R_{13}$ is $C_{1-12}$ alkyloxy. In some further such embodiments, each of $R^{11}$, $R^{12}$, and $R^{13}$ is selected independently from the group consisting of: methoxy, ethoxy, isopropoxy, propoxy, butoxy, sec-butoxy, isobutoxy, and tert-butoxy. In some even further embodiments, each of $R^{11}$, $R^{12}$, and $R_{13}$ is ethoxy.

In some embodiments of any of the aforementioned embodiments, $R^2$ is —O—$R^3$. Any number of groups may be suitably used for $R^3$. For example, in some embodiments, $R^3$ is $C_{1-12}$ alkyl. In some further such embodiments, $R^3$ is methyl, ethyl, propyl, isopropyl, butyl, isobutyl, sec-butyl, tert-butyl, phenyl, neopentyl, or 2-ethylhexyl. In some further such embodiments, $R^3$ is methyl, ethyl, or isopropyl. In some even further embodiments, $R^3$ is methyl. In some other embodiments, however, $R^3$ is $C_{3-101}$ oxyalkyl. In some such embodiments, $R^3$ is —$(CH_2—CH_2—O)$ w-$CH_3$, wherein w is an integer ranging from 1 to 50. In some further embodiments, w is an integer ranging from 1 to 40, or from 1 to 30, or from 1 to 25. In some even further such embodiments, w is an integer ranging from 1 to 20, such as 1, 2, 3, 4, 5, 6, 7, 8, 9, 10, 11, 12, 13, 14, 15, 16, 17, 18, 19, or 20. In some such embodiments, w is 3, 7, or 16. In some other embodiments, however, $R^3$ is $C_{1-12}$ alkyl, which is substituted by one or more —OH groups, wherein any two-OH substituents on immediately adjacent carbon atoms may optionally combine to form an epoxy group. In some such embodiments, $R^3$ is —$(CH_2)_x$—CH(O) $CH_2$, wherein x is an integer ranging from 1 to 12. (Note that-CH(O) $CH_2$ represents an epoxy group, with its three-membered ring having two carbon atoms and an oxygen atom. In some further such embodiments, x is an integer ranging from 1 to 6, such as 1, 2, 3, 4, 5, or 6. In some even further such embodiments, x is 1. In some other embodiments, however, $R^3$ is $C_{1-12}$ alkyl, which is substituted by one or more halogen atoms, such as fluorine or chlorine. In some such embodiments, $R^3$ is $C_{1-12}$ alkyl, which is substituted by one or more fluorine atoms. In some further such embodiments, $R^3$ is —$(CH_2)_y$—$(CF_2)_z$—$CF_3$, wherein y and z are integers than range independently from 0 to 12, or from 0 to 6. In some even further such embodiments, y is 1, 2, or 3, and wherein z is 1, 2, 3, or 4. In some even further embodiments, y is 2 and z is 3.

In some other embodiments of any of the aforementioned embodiments, $R^2$ is —NH—$R^4$. In some further such embodiments, $R^4$ is a moiety of formula (III):

$$-G^3-N^+(R^{21})(R^{22})-G^4-R^{23} \quad (III)$$

wherein: $G^3$ is $C_{1-12}$ alkylene: $G^4$ is $C_{1-6}$ alkylene; $R^{21}$ and $R_{22}$ are independently a hydrogen atom or $C_{1-20}$ alkyl; and $R^{23}$ is a hydrogen atom or a phenyl moiety. In some even further such embodiments, $G^3$ is —$(CH_2)_p$—, wherein p is an integer ranging from 1 to 6, such as 1, 2, 3, 4, 5, or 6. In some even further such embodiments, $G^4$ is —$(CH_2)_q$—, wherein q is an integer ranging from 1 to 3, such as 1, 2, or 3. In some further such embodiments, $R^{21}$ and $R_{22}$ are $C_{1-6}$ alkyl. In some further such embodiments, $R^{21}$ and $R_{22}$ are independently methyl, ethyl, or isopropyl. In some embodiments, $R^{21}$ and $R_{22}$ are both methyl. In some further embodiments, $R^{23}$ is a phenyl moiety (e.g., —$C_6H_5$).

In some such embodiments, each $R_2$ is independently —N($R^6$)($R^7$), where $R^6$ and $R^7$ may optionally combine to form a ring. The variables $R^6$ and $R^7$ can have any suitable value. In some embodiments, each $R^6$ and $R^7$ is independently $C_{1-12}$ alkyl. In some such embodiments, each $R^6$ and $R^7$ is independently methyl, ethyl, propyl, isopropyl, butyl, isobutyl, sec-butyl, tert-butyl, pentyl, neopentyl, or 2-ethylhexyl. In some further such embodiments, each $R^6$ and $R^7$ is independently methyl, ethyl, or isopropyl. In some even further such embodiments, each $R^6$ and $R^7$ is independently methyl or ethyl. In some even further such embodiments each $R^6$ and $R^7$ is methyl. In some embodiments, $R^6$ and $R^7$ combine to form a ring, where the nitrogen atom is part of the ring. In some embodiments, such rings include pyrrolidin-1-yl, pyrrol-1-yl, imidazolidin-1-yl, imidazol-1-yl, pyrazol-1-yl, pyrazolidin-1-yl, oxazolidin-3-yl, oxazol-3-yl, isoxazolin-3-yl, isoxazol-3-yl, thiazolidin-3-yl, thiazol-3-yl, isothiazolin-3-yl, isothiazol-3-yl, hexahydro-1,3,5-triazin-1-yl, azepan-1-yl, azepin-1-yl, 1,2-diazepin-1-yl, 1,3-diazepin-1-yl, and 1,4-diazepin-1-yl.

Sizing Compositions, Methods of Coating/Sizing, and Coated Articles

In certain aspects, the disclosure provides sizing (or coating) composition for a matrix reinforcement material, the sizing composition comprising one or more compounds of the previous aspects or any embodiments thereof.

In some embodiments, the sizing composition include a carrier. In such embodiments, the silane compounds can make up any suitable amount of the composition, depending on the nature of the carrier and the features of the materials to be coated. In some embodiments, the one or more silane compounds make up from 0.1 to 50 percent by weight, or from 0.5 to 30 percent by weight, or from 1 to 20 percent by weight, of the sizing composition, based on the total weight of the composition. Any suitable material can be used as the carrier. For example, in some embodiments, the carrier includes water (for example, is at least 80% by weight, or at least 90% by weight, or at least 95% by weight, water, based on the total weight of the carrier). In some embodiments, the carrier includes an organic solvent, such as methanol, ethanol, dimethyl formamide, diethyl ether, methyl ethyl ketone, toluene, and the like.

The sizing compositions can also include any suitable additives, such as those commonly used by persons of skill in the art. For example, the sizing compositions also include one or more additives, such as surfactants, pigments, antimicrobial agents, photostabilizers, and the like. Such compositions can also include additional coupling agents, and, can include cross-linking agents, such as when the coated materials are intended to be used in the context of reactive processing.

The sizing compositions can be designed to coat any suitable material, such as any material commonly used in reinforcements. Examples include, but are not limited to, siliceous material, such as silica or sand; glass, such as glass fiber, glass particles, or glass beads: metal, such as silver or titanium: metal oxide, such as zinc oxide or titanium dioxide; carbon, such as carbon nanoparticles, carbon nanotubes, graphite, graphene, diamond, and fullerenes: or any combination of the foregoing.

In some additional aspects, the disclosure provides methods of coating a matrix reinforcement material, the method comprising: providing a matrix reinforcement material and a sizing composition of the second aspect or any embodiments thereof; and contacting the matrix reinforcement material with the sizing composition.

As suggested above, the methods disclosed herein contemplate coating any suitable material, such as any material commonly used in reinforcements. Examples include, but are not limited to, siliceous material, such as silica or sand; glass, such as glass fiber, glass particles, or glass beads: metal, such as silver or titanium: metal oxide, such as zinc oxide or titanium dioxide: carbon, such as carbon nanoparticles, carbon nanotubes, graphite, graphene, diamond, and fullerenes: or any combination of the foregoing.

The coating can be carried out by any suitable means, such as those generally employed by skilled artisans in the application of sizing or coating compositions to reinforcement materials. Non-limiting examples include soaking, spraying, washing, or any combination thereof.

In some additional aspects, the disclosure provides coated matrix reinforcement materials, comprising a matrix reinforcement material, wherein at least a portion of the surface of the matrix reinforcement material comprises one or more compounds of the first aspect or any embodiments thereof.

As suggested above, the coated articles disclosed herein may be made of any suitable material, such as any material commonly used in reinforcements. Examples include, but are not limited to, siliceous material, such as silica or sand; glass, such as glass fiber, glass particles, or glass beads: metal, such as silver or titanium: metal oxide, such as zinc oxide or titanium dioxide: carbon, such as carbon nanoparticles, carbon nanotubes, graphite, graphene, diamond, and fullerenes: or any combination of the foregoing.

In some embodiments, the coated article is the product of the coating process described immediately above.

Matrix Reinforcement

In certain additional aspects, the disclosure provides methods of forming a reinforced material (such as a polymer material, or, in some other embodiments, concrete), comprising: providing a polymer material; and introducing into the polymer material one or more coated matrix reinforcement materials of the fourth aspect or any embodiments thereof.

In some embodiments, where the reinforced material is a polymer material, the polymer material comprises a thermoset polymer. In some further such embodiments, the thermoset polymer is a polyester, a polyurethane, a natural or synthetic rubber, a phenol-formaldehyde resin, a urea-formaldehyde resin, a melamine resin, a diallyl phthalate resin, an epoxy resin, an epoxy novolac resin, a benzoxazine resin, a polyimide, a bismaleimide resin, a polycyanurate, a cyanate ester resin, a furan resin, a silicone resin, a thiolyte resin, a vinyl ester resin, polyvinyl chloride, a polyolefin (such as polyethylene or polypropylene), or any prepolymers thereof, or any combinations of any of the foregoing. In some further such embodiments, the thermoset polymer is polyvinyl chloride or a polyolefin, such as polyethylene or polypropylene. In some further embodiments, it is polyethylene. In some other embodiments, it is polyvinyl chloride.

In certain related aspects, the disclosure provides reinforced articles, the articles comprising a matrix material and one or more coated matrix reinforcement materials of the fourth aspect or any embodiments thereof.

As suggested above, any suitable reinforced material can be used. In some embodiments, the reinforced material is concrete. In some other embodiments, the reinforced material is a polymeric material. In some embodiments, where the reinforced material is a polymeric material, the polymeric material comprises a thermoset polymer. In some further such embodiments, the thermoset polymer is a polyester, a polyurethane, a natural or synthetic rubber, a phenol-formaldehyde resin, a urea-formaldehyde resin, a melamine resin, a diallyl phthalate resin, an epoxy resin, an epoxy novolac resin, a benzoxazine resin, a polyimide, a bismaleimide resin, a polycyanurate, a cyanate ester resin, a furan resin, a silicone resin, a thiolyte resin, a vinyl ester resin, polyvinyl chloride, a polyolefin (such as polyethylene or polypropylene), or any prepolymers thereof, or any combinations of any of the foregoing. In some further such embodiments, the thermoset polymer is polyvinyl chloride or a polyolefin, such as polyethylene or polypropylene. In some further embodiments, it is polyethylene. In some other embodiments, it is polyvinyl chloride.

Adhesion Promotion

In certain additional aspects, the disclosure provides articles and methods, wherein the silane compounds disclosed herein are used to promote the adhesion of certain materials (such as, for example, paints, coatings, inks, adhesives, or sealants) to a substrate material.

Thus, in at least one aspect, the disclosure provides an article comprising: a substrate having a surface; and a material layer disposed on the surface of the substrate, thereby forming an interface between the material layer and the surface of the substrate; wherein the interface comprises one or more silane compounds according to any of the aforementioned aspects or embodiments disclosed herein.

The silane compounds can be introduced into the interface by any suitable means. For example, in some embodiments, the silane compounds are disposed onto the surface of the substrate prior to disposing the material layer onto the surface of the substrate. In some other embodiments, the silane compounds are introduced into the composition used to form the substrate and/or the material layer. In some such embodiments, the silane compounds may migrate to the interface, although such migration is not necessary.

The substrate material can be any suitable substrate material onto which other layers (such as, for example, paints, coatings, inks, adhesives, or sealants) are typically disposed. Non-limiting examples of suitable substrate materials include glass, ceramic, metal (such as steel, aluminum, or aluminum alloys), metal oxides, cellulosic materials (such as wood, paper, and the like), carbonaceous materials (such as carbon fibers, carbon nanotubes, graphite, diamond, and the like), polymeric materials (such as various thermoplastic and thermoset resins, polyolefins, acrylate resins, polycarbonates, fluoropolymers, and the like), and other like materials.

The material layer can be any suitable material that is commonly disposed onto substrates, such as those disclosed above. In some embodiments, the material layer comprises a paint composition, such as a water-based or solvent-based paint composition or a lacquer composition. In some other embodiments, the material layer comprises a coating composition, such as an adhesive coating, a fluoropolymer coating (such as PTFE), optical coatings (such as anti-reflective coatings, reflective coatings, light-absorbent coatings, UV-absorbent coatings), catalytic coatings (such as self-cleaning coatings), protective coatings (such as waterproofing layers, sealants, linings, maintenance coatings, lubricating coatings, corrosion-resistant coatings, wear-resistant coatings, insulating layers, anti-graffiti coatings, anti-microbial coatings, anti-fouling coatings, and the like), magnetic coatings, electrical coatings, scented coatings, decorative coatings, and the like. In some other embodiments, the material layer comprises an ink, such as a water-based or solvent-based ink. In some other embodiment, the material layer comprises a sealant. In some other embodiments, the material later comprises an adhesive.

Polymer Modifiers and Cross-Linking

In certain additional aspects, the disclosure provides modified polymers and methods of modifying polymers, which comprise reacting the silane compounds disclosed herein with certain functional groups on a polymer (such as hydroxyl groups) to create side chains that modify the polymer's compatibility with other materials or compositions, or that create pendant groups suitable for cross-linking. For example, in some instances, a polysiloxane polymer having hydroxyl groups, either on its side chain or in terminal locations, to graft silane compounds of the present disclosure onto the siloxane polymer. In some such instances, these grafts may impart different compatibilizing properties to the polymer, for example, when the silane has a polyalkylene glycol (such as PEO) on the end having the ester, acid, or alcohol. In some other such embodiments, these grafts may permit the polymer to react with other polymers, for example, in a linear manner (when the graft attaches at the terminal point) or as a cross-linker (when the graft attaches on the side chain of the polymer).

Treatments for Metal Surfaces; Corrosion Resistance

In certain additional aspects, the disclosure provides metal-treatment compositions comprising the silane compounds disclosed herein, and related methods of their use to treat metal surfaces. Such compositions can be applied to metal surfaces to impart a variety of benefits, including, but not limited to, improving resistance to corrosion (e.g., by inhibiting water ingress), enhancing stress dissipation during weathering, improving adhesion of the metal to various adhesives, and reducing or eliminating the need for chromium to treat surfaces. Such compositions comprise one or more of the silanes according to any of the aforementioned aspects and embodiments. Such compositions can include other functional silanes, as well as resins (such as epoxy resins, acrylic polymers and copolymers, and the like) or other inorganix materials, such as silica sol. Such compositions can be applied to metal surfaces for a period of time sufficient to permit the silane compounds to coat the surface.

Methods of Making Silanes

The silane compounds disclosed herein may be made by the methods illustrated in the Example section below. In general, starting materials, such as carboxylic acids, esters (e.g., methyl esters), or alcohols can be used. Examples include 9-decenoic acid, methyl 9-decenoate, 9-decen-1-ol, 10-undecenoic acid, methyl 10-undecenoate, 10-undecen-1-ol, 11-dodecenoic acid, methyl 11-dodecenoate, and 11-dodecen-1-ol, which can be derivatized by conventional means to make compounds of the inventions set forth herein.

Derivation from Renewable Sources

The silane compounds disclosed herein and used in any of the aspects and embodiments disclosed herein can, in certain embodiments, be derived from renewable sources, such as various natural oils. Any suitable methods can be used to make these compounds from such renewable sources. Suitable methods include, but are not limited to, fermentation, conversion by bioorganisms, and conversion by metathesis.

Olefin metathesis provides one possible means to convert certain natural oil feedstocks into olefins and esters that can be used in a variety of applications, or that can be further modified chemically and used in a variety of applications. In some embodiments, a composition (or components of a composition) may be formed from a renewable feedstock, such as a renewable feedstock formed through metathesis reactions of natural oils and/or their fatty acid or fatty ester derivatives. When compounds containing a carbon-carbon double bond undergo metathesis reactions in the presence of a metathesis catalyst, some or all of the original carbon-carbon double bonds are broken, and new carbon-carbon double bonds are formed. The products of such metathesis reactions include carbon-carbon double bonds in different locations, which can provide unsaturated organic compounds having useful chemical properties.

A wide range of natural oils, or derivatives thereof, can be used in such metathesis reactions. Examples of suitable natural oils include, but are not limited to, vegetable oils, algae oils, fish oils, animal fats, tall oils, derivatives of these oils, combinations of any of these oils, and the like. Representative non-limiting examples of vegetable oils include rapeseed oil (canola oil), coconut oil, corn oil, cottonseed oil, olive oil, palm oil, peanut oil, safflower oil, sesame oil, soybean oil, sunflower oil, linseed oil, palm kernel oil, tung oil, jatropha oil, mustard seed oil, pennycress oil, camelina oil, hempseed oil, and castor oil. Representative non-limiting examples of animal fats include lard, tallow, poultry fat, yellow grease, and fish oil. Tall oils are by-products of wood pulp manufacture. In some embodiments, the natural oil or natural oil feedstock comprises one or more unsaturated glycerides (e.g., unsaturated triglycerides). In some such embodiments, the natural oil feedstock comprises at least 50% by weight, or at least 60% by weight, or at least 70% by weight, or at least 80% by weight, or at least 90% by weight, or at least 95% by weight, or at least 97% by weight, or at least 99% by weight of one or more unsaturated triglycerides, based on the total weight of the natural oil feedstock.

The natural oil may include canola or soy bean oil, such as refined, bleached and deodorized soy bean oil (i.e., RBD soybean oil). Soybean oil typically includes about 95 percent by weight (wt %) or greater (e.g., 99 wt % or greater) triglycerides of fatty acids. Major fatty acids in the polyol esters of soy bean oil include but are not limited to saturated fatty acids such as palmitic acid (hexadecanoic acid) and stearic acid (octadecanoic acid), and unsaturated fatty acids such as oleic acid (9-octadecenoic acid), linoleic acid (9,12-octadecadienoic acid), and linolenic acid (9,12,15-octadecatrienoic acid).

Metathesized natural oils can also be used. Examples of metathesized natural oils include but are not limited to a metathesized vegetable oil, a metathesized algal oil, a metathesized animal fat, a metathesized tall oil, a metathesized derivatives of these oils, or mixtures thereof. For example, a metathesized vegetable oil may include metathesized canola oil, metathesized rapeseed oil, metathesized coconut oil, metathesized corn oil, metathesized cottonseed oil, metathesized olive oil, metathesized palm oil, metathesized peanut oil, metathesized safflower oil, metathesized sesame oil, metathesized soybean oil, metathesized sunflower oil, metathesized linseed oil, metathesized palm kernel oil, metathesized tung oil, metathesized jatropha oil, metathesized mustard oil, metathesized camelina oil, metathesized pennycress oil, metathesized castor oil, metathesized derivatives of these oils, or mixtures thereof. In another example, the metathesized natural oil may include a metathesized animal fat, such as metathesized lard, metathesized tallow, metathesized poultry fat, metathesized fish oil, metathesized derivatives of these oils, or mixtures thereof.

Such natural oils, or derivatives thereof, can contain esters, such as triglycerides, of various unsaturated fatty acids. The identity and concentration of such fatty acids varies depending on the oil source, and, in some cases, on the variety. In some embodiments, the natural oil comprises one or more esters of oleic acid, linoleic acid, linolenic acid, or any combination thereof. When such fatty acid esters are metathesized, new compounds are formed. For example, in embodiments where the metathesis uses certain short-chain olefins, e.g., ethylene, propylene, or 1-butene, and where the natural oil includes esters of oleic acid, an amount of 1-decene and 1-decenoid acid (or an ester thereof), among other products, are formed. Following transesterification, for example, with an alkyl alcohol, an amount of 9-decenoic acid alkyl ester is formed. In some such embodiments, a separation step may occur between the metathesis and the transesterification, where the alkenes are separated from the esters. In some other embodiments, transesterification can occur before metathesis, and the metathesis is performed on the transesterified product.

In some embodiments, the natural oil can be subjected to various pre-treatment processes, which can facilitate their utility for use in certain metathesis reactions. Useful pre-treatment methods are described in United States Patent Application Publication Nos. 2011/0113679, 2014/0275595, and 2014/0275681, all three of which are hereby incorporated by reference as though fully set forth herein.

In some embodiments, after any optional pre-treatment of the natural oil feedstock, the natural oil feedstock is reacted in the presence of a metathesis catalyst in a metathesis reactor. In some other embodiments, an unsaturated ester (e.g., an unsaturated glyceride, such as an unsaturated triglyceride) is reacted in the presence of a metathesis catalyst in a metathesis reactor. These polyol esters of unsaturated fatty acids may be a component of a natural oil feedstock, or may be derived from other sources, e.g., from esters generated in earlier-performed metathesis reactions. In certain embodiments, in the presence of a metathesis catalyst, the natural oil or unsaturated ester can undergo a self-metathesis reaction with itself. In other embodiments, the natural oil or unsaturated ester undergoes a cross-metathesis reaction with the low-molecular-weight olefin or mid-weight olefin. The self-metathesis and/or cross-metathesis reactions form a metathesized product wherein the metathesized product comprises olefins and esters.

In some embodiments, the low-molecular-weight olefin is in the $C_{2-6}$ range. As a non-limiting example, in one embodiment, the low-molecular-weight olefin may comprise at least one of: ethylene, propylene, 1-butene, 2-butene, isobutene, 1-pentene, 2-pentene, 3-pentene, 2-methyl-1-butene, 2-methyl-2-butene, 3-methyl-1-butene, cyclopentene, 1,4-pentadiene, 1-hexene, 2-hexene, 3-hexene, 4-hexene, 2-methyl-1-pentene, 3-methyl-1-pentene, 4-methyl-1-pentene, 2-methyl-2-pentene, 3-methyl-2-pentene, 4-methyl-2-pentene, 2-methyl-3-pentene, and cyclohexene. In some instances, a higher-molecular-weight olefin can also be used.

In some embodiments, the metathesis comprises reacting a natural oil feedstock (or another unsaturated ester) in the presence of a metathesis catalyst. In some such embodiments, the metathesis comprises reacting one or more unsaturated glycerides (e.g., unsaturated triglycerides) in the natural oil feedstock in the presence of a metathesis catalyst. In some embodiments, the unsaturated glyceride comprises one or more esters of oleic acid, linoleic acid, linoleic acid, or combinations thereof. In some other embodiments, the unsaturated glyceride is the product of the partial hydrogenation and/or the metathesis of another unsaturated glyceride (as described above). In some such embodiments, the metathesis is a cross-metathesis of any of the aforementioned unsaturated triglyceride species with another olefin, e.g., an alkene. In some such embodiments, the alkene used in the cross-metathesis is a lower alkene, such as ethylene, propylene, 1-butene, 2-butene, etc. In some embodiments, the alkene is ethylene. In some other embodiments, the alkene is propylene. In some further embodiments, the alkene is 1-butene. And in some even further embodiments, the alkene is 2-butene.

Metathesis reactions can provide a variety of useful products, when employed in the methods disclosed herein. For example, the polyol esters of unsaturated fatty acids may be derived from a natural oil feedstock, in addition to other valuable compositions. Moreover, in some embodiments, a number of valuable compositions can be targeted through the self-metathesis reaction of a natural oil feedstock, or the cross-metathesis reaction of the natural oil feedstock with a low-molecular-weight olefin or mid-weight olefin, in the presence of a metathesis catalyst. Such valuable compositions can include fuel compositions, detergents, surfactants, and other specialty chemicals. Additionally, transesterified products (i.e., the products formed from transesterifying an ester in the presence of an alcohol) may also be targeted, non-limiting examples of which include: fatty acid methyl esters ("FAMEs"); biodiesel: 9-decenoic acid ("9DA") esters, 9-undecenoic acid ("9UDA") esters, and/or 9-dodecenoic acid ("9DDA") esters: 9DA, 9UDA, and/or 9DDA; alkali metal salts and alkaline earth metal salts of 9DA, 9UDA, and/or 9DDA; dimers of the transesterified products; and mixtures thereof.

Further, in some embodiments, multiple metathesis reactions can also be employed. In some embodiments, the multiple metathesis reactions occur sequentially in the same reactor. For example, a glyceride containing linoleic acid can be metathesized with a terminal lower alkene (e.g., ethylene, propylene, 1-butene, and the like) to form 1,4-decadiene, which can be metathesized a second time with a terminal lower alkene to form 1,4-pentadiene. In other embodiments, however, the multiple metathesis reactions are not sequential, such that at least one other step (e.g., transesterification, hydrogenation, etc.) can be performed between the first metathesis step and the following metathesis step. These multiple metathesis procedures can be used to obtain products that may not be readily obtainable from a single metathesis reaction using available starting materials. For example, in some embodiments, multiple metathesis can involve self-metathesis followed by cross-metathesis to obtain metathesis dimers, trimmers, and the like. In some other embodiments, multiple metathesis can be used to obtain olefin and/or ester components that have chain lengths that may not be achievable from a single metathesis reaction with a natural oil triglyceride and typical lower alkenes (e.g., ethylene, propylene. 1-butene. 2-butene, and the like). Such multiple metathesis can be useful in an industrial-scale reactor, where it may be easier to perform multiple metathesis than to modify the reactor to use a different alkene.

The conditions for such metathesis reactions, and the reactor design, and suitable catalysts are as described above with reference to the metathesis of the olefin esters. That discussion is incorporated by reference as though fully set forth herein.

In the embodiments above, the natural oil (e.g., as a glyceride) is metathesized, followed by transesterification. In some other embodiments, transesterification can precede metathesis, such that the fatty acid esters subjected to metathesis are fatty acid esters of monohydric alcohols, such as methanol, ethanol, or isopropanol.

Olefin Metathesis

In some embodiments, one or more of the unsaturated monomers can be made by metathesizing a natural oil or natural oil derivative. The terms "metathesis" or "metathesizing" can refer to a variety of different reactions, including, but not limited to, cross-metathesis, self-metathesis, ring-opening metathesis, ring-opening metathesis polymerizations ("ROMP"), ring-closing metathesis ("RCM"), and acyclic diene metathesis ("ADMET"). Any suitable metathesis reaction can be used, depending on the desired product or product mixture.

In some embodiments, after any optional pre-treatment of the natural oil feedstock, the natural oil feedstock is reacted in the presence of a metathesis catalyst in a metathesis reactor. In some other embodiments, an unsaturated ester (e.g., an unsaturated glyceride, such as an unsaturated triglyceride) is reacted in the presence of a metathesis catalyst in a metathesis reactor. These unsaturated esters may be a component of a natural oil feedstock, or may be derived from other sources, e.g., from esters generated in earlier-performed metathesis reactions. In certain embodiments, in the presence of a metathesis catalyst, the natural oil or unsaturated ester can undergo a self-metathesis reaction with itself. In other embodiments, the natural oil or unsaturated ester undergoes a cross-metathesis reaction with the low-molecular-weight olefin or mid-weight olefin. The self-metathesis and/or cross-metathesis reactions form a metathesized product wherein the metathesized product comprises olefins and esters.

In some embodiments, the low-molecular-weight olefin is in the $C_{2-6}$ range. As a non-limiting example, in one embodiment, the low-molecular-weight olefin may comprise at least one of: ethylene, propylene, 1-butene, 2-butene, isobutene, 1-pentene, 2-pentene, 3-pentene, 2-methyl-1-butene, 2-methyl-2-butene, 3-methyl-1-butene, cyclopentene, 1,4-pentadiene, 1-hexene, 2-hexene, 3-hexene, 4-hexene, 2-methyl-1-pentene, 3-methyl-1-pentene, 4-methyl-1-pentene, 2-methyl-2-pentene, 3-methyl-2-pentene, 4-methyl-2-pentene, 2-methyl-3-pentene, and cyclohexene. In some instances, a higher-molecular-weight olefin can also be used.

In some embodiments, the metathesis comprises reacting a natural oil feedstock (or another unsaturated ester) in the presence of a metathesis catalyst. In some such embodiments, the metathesis comprises reacting one or more unsaturated glycerides (e.g., unsaturated triglycerides) in the natural oil feedstock in the presence of a metathesis catalyst. In some embodiments, the unsaturated glyceride comprises one or more esters of oleic acid, linoleic acid, linoleic acid, or combinations thereof. In some other embodiments, the unsaturated glyceride is the product of the partial hydrogenation and/or the metathesis of another unsaturated glyceride (as described above). In some such embodiments, the metathesis is a cross-metathesis of any of the aforementioned unsaturated triglyceride species with another olefin, e.g., an alkene. In some such embodiments, the alkene used in the cross-metathesis is a lower alkene, such as ethylene, propylene, 1-butene, 2-butene, etc. In some embodiments, the alkene is ethylene. In some other embodiments, the alkene is propylene. In some further embodiments, the alkene is 1-butene. And in some even further embodiments, the alkene is 2-butene.

Metathesis reactions can provide a variety of useful products, when employed in the methods disclosed herein. For example, terminal olefins and internal olefins may be derived from a natural oil feedstock, in addition to other valuable compositions. Moreover, in some embodiments, a number of valuable compositions can be targeted through the self-metathesis reaction of a natural oil feedstock, or the cross-metathesis reaction of the natural oil feedstock with a low-molecular-weight olefin or mid-weight olefin, in the presence of a metathesis catalyst. Such valuable compositions can include fuel compositions, detergents, surfactants, and other specialty chemicals. Additionally, transesterified products (i.e., the products formed from transesterifying an ester in the presence of an alcohol) may also be targeted, non-limiting examples of which include: fatty acid methyl esters ("FAMEs"); biodiesel: 9-decenoic acid ("9DA") esters, 9-undecenoic acid ("9UDA") esters, and/or 9-dodecenoic acid ("9DDA") esters: 9DA, 9UDA, and/or 9DDA; alkali metal salts and alkaline earth metal salts of 9DA, 9UDA, and/or 9DDA; dimers of the transesterified products; and mixtures thereof.

Further, in some embodiments, the methods disclosed herein can employ multiple metathesis reactions. In some embodiments, the multiple metathesis reactions occur sequentially in the same reactor. For example, a glyceride containing linoleic acid can be metathesized with a terminal lower alkene (e.g., ethylene, propylene, 1-butene, and the like) to form 1,4-decadiene, which can be metathesized a second time with a terminal lower alkene to form 1,4-pentadiene. In other embodiments, however, the multiple metathesis reactions are not sequential, such that at least one other step (e.g., transesterification, hydrogenation, etc.) can be performed between the first metathesis step and the following metathesis step. These multiple metathesis procedures can be used to obtain products that may not be readily obtainable from a single metathesis reaction using available starting materials. For example, in some embodiments, multiple metathesis can involve self-metathesis followed by cross-metathesis to obtain metathesis dimers, trimmers, and the like. In some other embodiments, multiple metathesis can be used to obtain olefin and/or ester components that have chain lengths that may not be achievable from a single metathesis reaction with a natural oil triglyceride and typical lower alkenes (e.g., ethylene, propylene, 1-butene, 2-butene, and the like). Such multiple metathesis can be useful in an industrial-scale reactor, where it may be easier to perform multiple metathesis than to modify the reactor to use a different alkene.

The metathesis process can be conducted under any conditions adequate to produce the desired metathesis products. For example, stoichiometry, atmosphere, solvent, temperature, and pressure can be selected by one skilled in the art to produce a desired product and to minimize undesirable byproducts. In some embodiments, the metathesis process may be conducted under an inert atmosphere. Similarly, in embodiments were a reagent is supplied as a gas, an inert gaseous diluent can be used in the gas stream. In such embodiments, the inert atmosphere or inert gaseous diluent typically is an inert gas, meaning that the gas does not interact with the metathesis catalyst to impede catalysis to a substantial degree. For example, non-limiting examples of inert gases include helium, neon, argon, and nitrogen, used individually or in with each other and other inert gases.

The rector design for the metathesis reaction can vary depending on a variety of factors, including, but not limited to, the scale of the reaction, the reaction conditions (heat, pressure, etc.), the identity of the catalyst, the identity of the materials being reacted in the reactor, and the nature of the feedstock being employed. Suitable reactors can be designed by those of skill in the art, depending on the relevant factors, and incorporated into a refining process such, such as those disclosed herein.

The metathesis reactions disclosed herein generally occur in the presence of one or more metathesis catalysts. Such methods can employ any suitable metathesis catalyst. The metathesis catalyst in this reaction may include any catalyst or catalyst system that catalyzes a metathesis reaction. Any known metathesis catalyst may be used, alone or in combination with one or more additional catalysts. Examples of metathesis catalysts and process conditions are described in US 2011/0160472, incorporated by reference herein in its entirety, except that in the event of any inconsistent disclosure or definition from the present specification, the disclosure or definition herein shall be deemed to prevail. A number of the metathesis catalysts described in US 2011/0160472 are presently available from Materia, Inc. (Pasadena, Calif.).

In some embodiments, the metathesis catalyst includes a Grubbs-type olefin metathesis catalyst and/or an entity derived therefrom. In some embodiments, the metathesis catalyst includes a first-generation Grubbs-type olefin metathesis catalyst and/or an entity derived therefrom. In some embodiments, the metathesis catalyst includes a second-generation Grubbs-type olefin metathesis catalyst and/or an entity derived therefrom. In some embodiments, the metathesis catalyst includes a first-generation Hoveyda-Grubbs-type olefin metathesis catalyst and/or an entity derived therefrom. In some embodiments, the metathesis catalyst includes a second-generation Hoveyda-Grubbs-type olefin metathesis catalyst and/or an entity derived therefrom. In some embodiments, the metathesis catalyst includes one or a plurality of the ruthenium carbene metathesis catalysts sold by Materia, Inc. of Pasadena. California and/or one or more entities derived from such catalysts. Representative metathesis catalysts from Materia, Inc. for use in accordance with the present teachings include but are not limited to those sold under the following product numbers as well as combinations thereof: product no. C823 (CAS no. 172222-30-9), product no. C848 (CAS no. 246047-72-3), product no. C601 (CAS no. 203714-71-0)), product no. C627 (CAS no. 301224-40-8), product no. C571 (CAS no. 927429-61-6), product no. C598 (CAS no. 802912-44-3), product no. C793 (CAS no. 927429-60-5), product no. C801 (CAS no. 194659-03-9), product no. C827 (CAS no. 253688-91-4), product no. C884 (CAS no. 900169-53-1), product no. C833 (CAS no. 1020085-61-3), product no. C859 (CAS no. 832146-68-6), product no. C711 (CAS no. 635679-24-2), product no. C933 (CAS no. 373640-75-6).

In some embodiments, the metathesis catalyst includes a molybdenum and/or tungsten carbene complex and/or an entity derived from such a complex. In some embodiments, the metathesis catalyst includes a Schrock-type olefin metathesis catalyst and/or an entity derived therefrom. In some embodiments, the metathesis catalyst includes a high-oxidation-state alkylidene complex of molybdenum and/or an entity derived therefrom. In some embodiments, the metathesis catalyst includes a high-oxidation-state alkylidene complex of tungsten and/or an entity derived therefrom. In some embodiments, the metathesis catalyst includes molybdenum (VI). In some embodiments, the metathesis catalyst includes tungsten (VI). In some embodiments, the metathesis catalyst includes a molybdenum-and/or a tungsten-containing alkylidene complex of a type described in one or more of (a) Angew. Chem. Int. Ed. Engl., 2003, 42, 4592-4633; (b) Chem. Rev., 2002, 102, 145-179; and/or (c) Chem. Rev., 2009, 109, 3211-3226, each of which is incorporated by reference herein in its entirety, except that in the event of any inconsistent disclosure or definition from the present specification, the disclosure or definition herein shall be deemed to prevail.

In certain embodiments, the metathesis catalyst is dissolved in a solvent prior to conducting the metathesis reaction. In certain such embodiments, the solvent chosen may be selected to be substantially inert with respect to the metathesis catalyst. For example, substantially inert solvents include, without limitation: aromatic hydrocarbons, such as benzene, toluene, xylenes, etc.: halogenated aromatic hydrocarbons, such as chlorobenzene and dichlorobenzene: aliphatic solvents, including pentane, hexane, heptane, cyclohexane, etc.; and chlorinated alkanes, such as dichloromethane, chloroform, dichloroethane, etc. In some embodiments, the solvent comprises toluene.

In other embodiments, the metathesis catalyst is not dissolved in a solvent prior to conducting the metathesis reaction. The catalyst, instead, for example, can be slurried with the natural oil or unsaturated ester, where the natural oil or unsaturated ester is in a liquid state. Under these conditions, it is possible to eliminate the solvent (e.g., toluene) from the process and eliminate downstream olefin losses when separating the solvent. In other embodiments, the metathesis catalyst may be added in solid state form (and not slurried) to the natural oil or unsaturated ester (e.g., as an auger feed).

The metathesis reaction temperature may, in some instances, be a rate-controlling variable where the temperature is selected to provide a desired product at an acceptable rate. In certain embodiments, the metathesis reaction temperature is greater than −40° C., or greater than −20° C., or greater than (° C.), or greater than 10° C. In certain embodiments, the metathesis reaction temperature is less than 200° C., or less than 150° C., or less than 120° C. In some embodiments, the metathesis reaction temperature is between 0° C. and 150° C., or is between 10° C. and 120° C.

The metathesis reaction can be run under any desired pressure. In some instances, it may be desirable to maintain a total pressure that is high enough to keep the cross-metathesis reagent in solution. Therefore, as the molecular weight of the cross-metathesis reagent increases, the lower pressure range typically decreases since the boiling point of the cross-metathesis reagent increases. The total pressure may be selected to be greater than 0.1 atm (10 kPa), or greater than 0.3 atm (30 kPa), or greater than 1 atm (100) kPa). In some embodiments, the reaction pressure is no more than about 70 atm (7000 kPa), or no more than about 30 atm (3000 kPa). In some embodiments, the pressure for the metathesis reaction ranges from about 1 atm (100 kPa) to about 30 atm (3000 kPa).

EXAMPLES

Example 1: Intermediate Preparation—Unsaturated Ethoxylate

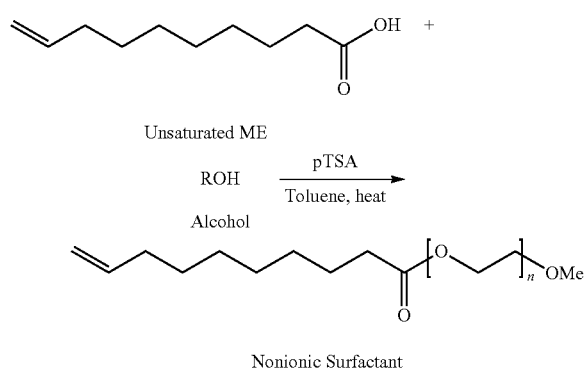

Into a 2 liter, 4-necked round-bottomed flask (45/50 and 24/40) equipped with a heating mantle, magnetic stirrer, Dean-Stark trap, condenser, thermocouple, glass stopper, and a nitrogen inlet was added the Carbowax followed by an equal molar amount of the carboxylic acid. This was dissolved into toluene (about 250 g) and the para-toluene sulfonic acid (pTsOH, 1.0 g) added. The reaction was stirred to homogenize and heating was begun (145-150° C.). The water that was collected in the Dean-Stark trap was periodically removed and measured. The reaction progress was monitored by the amount of water collected. Occasionally, it was necessary to add an additional amount of pTsOH (1.0 g) to push the reaction to completion. After several days of reflux, the amount of water collected approached the theoretical amount and the collection rate decreased to about 0.5 g in 8 hours so that the reaction was judged complete. The orange-colored reaction was cooled to below 100° C. and an equal weight of potassium carbonate ($K_2CO_3$) to the pTsOH was added in all at once and stirred overnight at ambient temperature. The next day, a small sample was removed, dissolve into water, and its pH measured to ensure that the reaction mixture had been neutralized. The reaction mixture was vacuum filtered through a pad of celite, and concentrated in vacuo (ending at 100° C./full vacuum for 15 mins). The stripped MEE was transferred hot into a glass bottle for storage. Retains were analyzed by high temperature gas chromatography (HTGC) to estimate their purities. Yield was near 100%.

The resulting product was further purified. In the case where n is 3, This crude material was vacuumed distilled at 142-148° C./0.3 torr to afford a clear, colorless liquid (97.2 area %) suitable for use in the silylation step. The uC10MEE-03 showed: FTIR ($cm^{-1}$) 2927 (m), 2857 (m), 1737 (s), 1640 (w), 1111 (vs), 911 (m): $^1$H-NMR (ppm) 5.8 (d of d of t, 1H), 4.9 (d of d, 2H), 4.2 (t, 2H), 3.6 (m, 8H), 3.5 (m, 2H), 3.4 (s, 3H), 2.3 (d of d, 2H), 2.0 (d of d, 2H), 1.6 (t, 2H), 1.3 (m, 8H) $^{13}$C-NMR (ppm) 173.8, 139.0, 114.2, 71.9, 70.6, 70.5, 70.5, 69.2, 63.3, 59.0, 34.1, 33.7, 29.1, 29.0, 28.9, 28.8, 24.8; CG/MS (m/e) 316.2, 197.2, 99.0, 59.1.

In the case where n is 7, The initial attempt to silylated the uC10MEE-07 distribution of ethoxylates failed to afford any product. Due to the high molecular weight of the uC10MEE-07 (492.3), it was unlikely that product could be taken overhead via a vacuum distillation. Hence purification was accomplished by silica gel chromatography (60 mesh, 2"×6" column). The uC10MEE-07 (100 g) was diluted with ethyl acetate (EtOAc, 50 g) and placed on top of the column. Elution proceeded as in Table 1. The uC10MEE-07 could readily be seen eluting down and off the column, making the collection process routine.

TABLE 1

| Number | Eluent Used | Amount | Comments |
|---|---|---|---|
| 1 | EtO Ac | 150 g | uC10MEE-07 added to column |
| 2 | EtO Ac | 400 ml | Nil |
| 3 | 1% MeOH/EtOAc | 400 ml | Nil |
| 4 | 1% MeOH/EtOAc | 400 ml | Collect fraction 1 |
| 5 | 1% MeOH/EtOAc | 400 ml | End of Fraction 1, 93.4 g isolated |
| 6 | 3% MeOH/EtOAc | 400 ml | Collect fraction 2 |
| 7 | 5% MeOH/EtOAc | 400 ml | End of Fraction 2, 2.2 g isolated |

Both fractions were concentrated in vacuo and analyzed by high temperature gas chromatography (HTGC). While Fraction 1 was primarily uC10MEE-07, Fraction 2 was ~75% MPEG 350. Fraction 1 was fully characterized and used in the subsequent silylation reaction. The uC10MEE-07 showed: FTIR ($cm^{-1}$) 2924 (m), 2863 (m), 1736 (m), 1640 (w), 1109 (vs): $^1$H-NMR (ppm) 5.8 (d of d of t, 1H), 4.9 (d of d, 2H), 4.2 (d of d, 2H), 3.6 (m, 24H), 3.5 (m, 2H), 3.4 (s, 3H), 2.3 (d of d, 2H), 2.0 (d of d, 2H), 1.6 (m, 2H), 1.3 (m, 8H); $^{13}$C-NMR (ppm) 173.8, 138.0, 114.2, 71.7, 70.6, 70.5, 70.4, 69.1, 63.3, 59.0, 34.1, 33.7, 29.1, 29.0, 28.9, 28.8, 24.8; CG/MS (m/e) 359.2, 197.1, 103.1, 59.1.

Example 2: Intermediate Preparation—Unsaturated Fluoro Compound

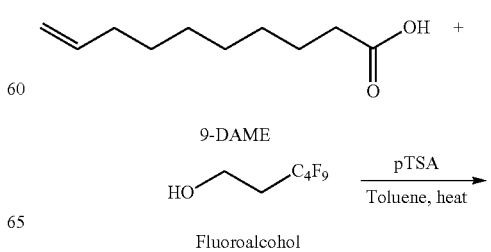

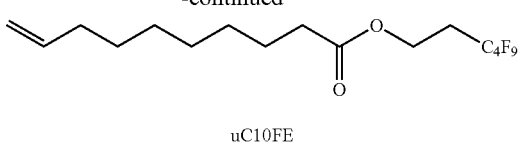

uC10FE

Into a 250 ml 3-necked round-bottomed flask equipped with a nitrogen inlet, stir bar, heating mantle, thermocouple with adaptor and J-Kem controller, condenser, and Dean-Stark trap was added in the 9-decenoic acid (9-DA, 24.6 g, 91% pure, 0.132 mol), 3,3,4,4,5,5,6,6,6-nonafluoro-1-hexanol (40.0 g, 0.152 mol, 1.15 equivalences), para-toluene sulfonic acid (0.20 g, 1 mol %) and toluene (50 ml). The reaction was stirred, the nitrogen sweep begun, and heating applied to collect distillate in the pre-filled Dean-Stark trap. The reaction was monitored by the amount of water collected in the Dean-Stark trap and by FTIR as the reaction neared completion. Additional amounts of the fluoroalcohol can be added to drive the reaction to completion. The crude reaction product was washed with a saturated bicarbonate aqueous solution (1×25 ml), distilled water (2×25 ml) and dried through a cone of sodium sulfate.

The resulting organic phase was concentrated in vacuo and transferred into a 100 ml round-bottomed flask equipped with a short path distillation apparatus. Vacuum was applied and product was collected (83° C./0.44 torr) to afford the desired fluoroester as a clear, colorless liquid (48.3 g, 97% pure, 85% yield). The uC10 fluoro ester showed: FTIR (cm$^{-1}$) 1745 (m), 1642 (w), 1234 (vs), 1221 (vs), 1167 (vs): $^1$H-NMR (ppm) $^{13}$C-NMR (ppm) CG/MS (m/e) 416.2, 319, 152, 135, 110, 55.

Example 3: Intermediate Preparation—Fatty Acid Salt

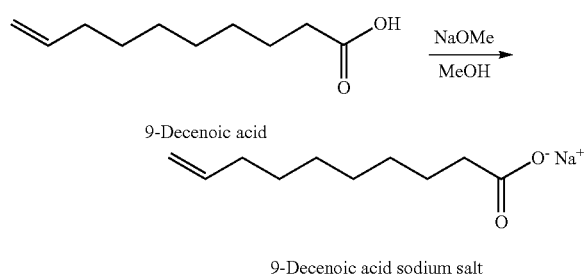

9-Decenoic acid

9-Decenoic acid sodium salt

Into a 3 liter pear-shaped flask equipped with a stir bar, a heat plate, and a nitrogen inlet was added in a 25 wt % sodium methoxide in methanol solution (108.0 g, 0.500 mol). To this stirred solution was added the 9-decenoic acid (85.0 g, 0.455 mol, 91% pure) slowly over time. An additional amount of methanol was added (460 g) to ensure even mixing. The reaction was stirred overnight at room temperature to afford a cloudy solution with white chunks of solids. This was heated to afford an opaque yellow solution whose pH was determined to be 10 (a sample removed, diluted with water, and dipped into a strip of pH paper). Additional amounts of 9-DA was added (about 6.8 g) to lower the pH down to 7.

The reaction was concentrated in vacuo to a slurry, diluted with ethyl acetate (EtOAc, 600 ml) and placed back on the rotovap (without vacuum) to homogenize. The resulting slurry was vacuum filtered and the resulting solids transferred back into the pear-shaped flask, concentrated in vacuo (95° C./full vacuum), and dried under high vacuum. The resulting water solid was scrapped out and stored in a glass jar (78.8 g, 97 area % pure, 81% yield). The FTIR showed no carboxylate carbonyl stretch and the salt was silylated and analyzed by GC. The acid value was take and the solid was found to contain about 2.2 wt % 9-DA remained. The 9-DA Na salt showed: FTIR (cm$^{-1}$) 2922 (m), 1561 (vs), 1425 (m), 722 (m); acid number 6.53.

Example 4: Intermediate Preparation—Unsaturated Glycidyl Ether

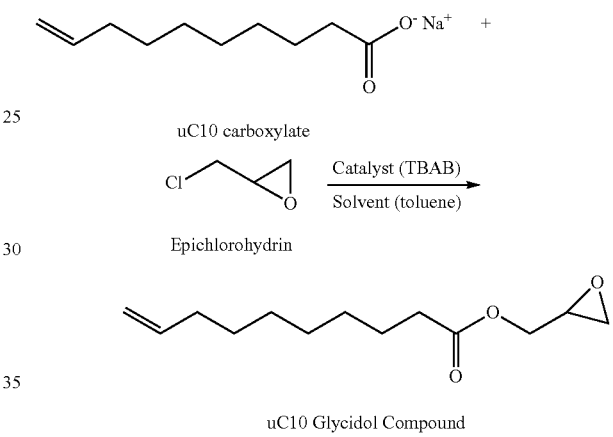

uC10 carboxylate

Epichlorohydrin uC10 Glycidol Compound

Into a 100 ml three-necked round-bottomed flask equipped with a magnetic stirrer, a thermocouple with adapter, a heating mantle, a condenser, and a nitrogen inlet was added the 9-decenoic acid, sodium salt (19.6 g, 0.10 mol), tetrabutyl ammonium bromide (1.06 g. 3.3 mol %), and toluene (35 ml). This was stirred overnight at ambient temperature, but did not appear to dissolve. The epichlorohydrin was added (11.8 ml, 0.15 mol, 1.5 equivalences) and heat applied, but the reaction failed to stir initially. Over time the amorphous 9-DA sodium salt slowly dissolved and was replaced by a granular sodium chloride. The reaction was judged complete by a visual inspection and the crude reaction mixture placed into a 250 ml separatory funnel. A series of water washes were performed (3×100 ml) to remove any residual epichlorohydrin. The yellow organic phase was dried though a cone of sodium sulfate and transferred into a 100 ml round-bottomed flask equipped with a short path distillation apparatus. Vacuum was applied and product was collected as a clear, colorless liquid (95-98° C./0.25 torr, 10.4 g, 45% yield, 93% pure?). The uC10 glycidyl ester showed: IR (cm$^{-1}$) 2928 (m), 1740 (vs), 1640 (w), 1173 (s), 910 (s): $^1$H-NMR (ppm) 5.7 (d of d of t, 1H), 4.9 (d of d, 2H), 4.4 (d of d, 1H), 3.9 (d of d, 1H), 3.2 (m, 1H), 2.8 (t, 1H), 2.6 (m, 1H), 2.3 (t, 2H), 2.0 (m, 2H), 1.6 (m, 2H), 1.3 (m, 8H); $^{13}$C-NMR (ppm) 173.4, 139.0, 114.1, 64.7, 49.3, 44.5, 34.0, 33.7, 29.0, 28.9, 28.8, 28.7, 24.8; CG/MS (m/e) 225.2, 185, 152, 129, 116, 98, 83, 69, 55.

Example 5: Intermediate Preparation—Unsaturated DMAPA Amide

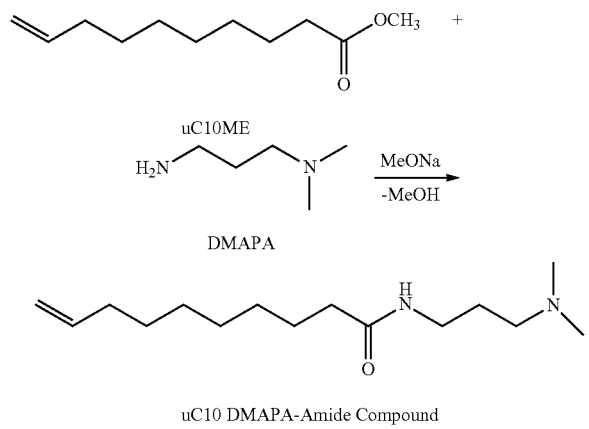

uC10 DMAPA-Amide Compound

Into a 2-L four-necked round-bottomed flask equipped with a magnetic stirrer, thermocouple with adapter, heating mantle, rubber septa with needle, short path distillation head, and nitrogen inlet was added the 9-decenoic acid methyl ester (674 g, 3.66 mol) and the dimethylaminopropylamine, DMAPA, (448 g, 4.39 mol, 1.2 equivalence, bp=133° C.). The nitrogen was bubbled though the reactants (15 min) before the 25% sodium methoxide in methanol (13.5 g, 3.4 g active, 0.50 wt % based on starting ester) was added. The nitrogen bubbling was stopped and the reaction mixture was heated to 110° C., when distillate came overhead. The temperature was raised to 130° C. and the reaction progress monitored by FTIR. After 10 h the reaction was judged complete as the ester stretch (1745 cm-1) was replaced by an amide stretch (1645 cm-1). Once cool, an equivalent amount of acetic acid was added (3.8 g, 0.062 mol) and the crude reaction was vacuum filtered through celite to afford a red orange liquid. The lights were removed in vacuo to afford a dark red oil (820 g, 88% yield, 99.9% pure). A portion was distilled overhead (144° C./0.25 torr) and isolated as a very light yellow, clear liquid (96% recovery, 99.9% pure). The uC10 DMAPA amide showed: IR (cm$^{-1}$) 3291 (br, w), 2926 (m), 1643 (s), 1551 (m), 1551 (m), 1033 (m): $^1$H-NMR (ppm, CDCl$_3$) 7.0 (br. s, 1H), 5.8 (m, 1H), 5.0 (s, 1H), 4.9 (t, 1H), 3.3 (q, 2H), 2.4 (t, 2H), 2.2 (s, 6H), 2.1 (t, 2H), 2.0 (m, 2H), 1.6 (m, 4H), 1.3 (m, 8H): $^{13}$C-NMR (ppm) 173, 139, 114, 57, 45, 39, 37, 34, 29.2, 29.2, 29.0, 28.8, 26, 25; GC/MS (m/e) 254.2, 157, 84, 72, 58, 41.

Example 6: Silylation

Silylation was carried out on each of the above intermediates according to the following procedure. Into a 50 ml three-necked, round-bottomed flask equipped with a magnetic stirrer and plate, a short path distillation apparatus with a thermometer, a receiving flask and a nitrogen inlet, a thermocouple with a J-Kem controller, and a heating mantle was placed the unsaturated C10 derivative (0.05 mol). To this was added the TES (9.7 ml, 8.6 g, 0.053 mol, 1.05 equivalents). The reaction was warmed to 60° C. when the Karstedt catalyst was added (~6 microliters of a 2 wt % solution in xylene, Sigma Aldrich 479519). The reaction was heated to 75° C. for 6 h and cooled overnight. The next day product was isolated by a vacuum distillation. The receiving flask cooled to −78° C. and vacuum was slowly applied to remove both the TES and starting uC10 derivative. On occasion, the silylated product was taken overhead as well. Their structure shown in Table 2.

TABLE 2

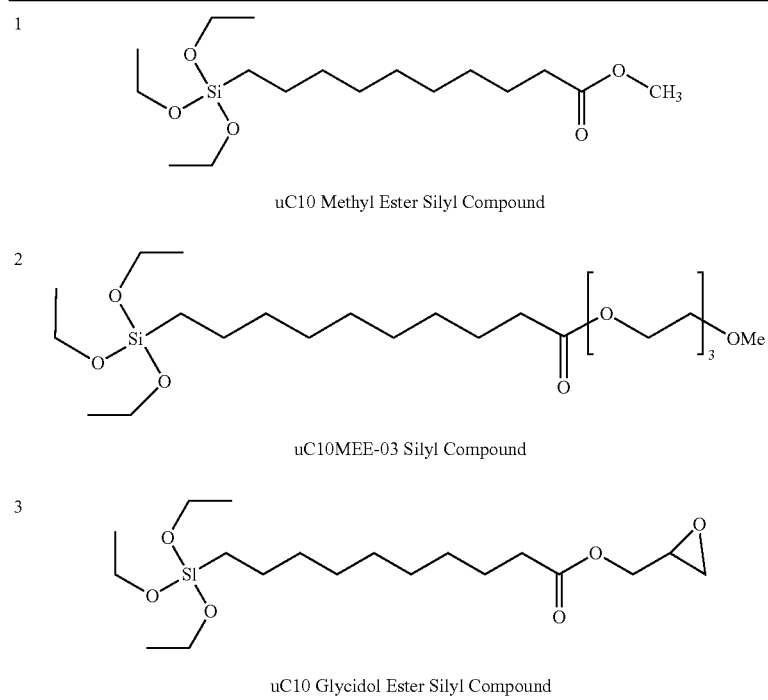

1 uC10 Methyl Ester Silyl Compound 2 uC10MEE-03 Silyl Compound 3 uC10 Glycidol Ester Silyl Compound

TABLE 2-continued

4

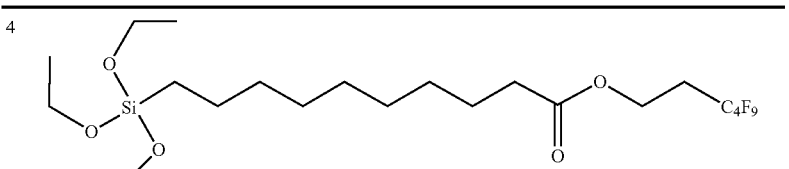

uC10 Fluoro Ester Silyl Compound

5

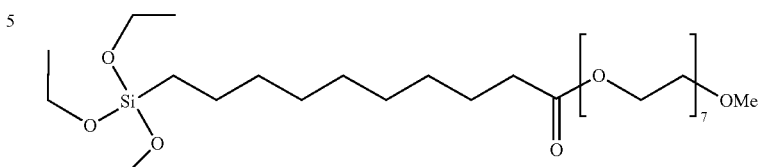

uC10MEE-07 Silyl Compound

6

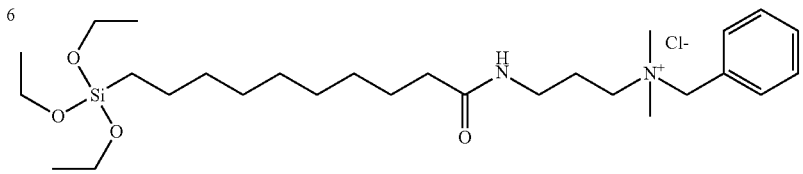

uC10 Amide-Amino Benzyl Quat Silyl Compound

The spectroscopic data for each of the above novel silylated compounds is set forth below.

10-TES DAME ($C_{17}H_{36}SiO_5$)(Compound 1): FTIR (cm$^{-1}$) 2926 (m), 1742 (m), 1167 (m), 1103 (s), 1078 (vs), 956 (m), 789 (m): $^1$H-NMR (ppm) 3.8 (q, 6H), 3.6 (s, 3H), 2.3 (t, 2H), 1.6 (m, 2H), 1.4 (m 2H), 1.2 (m, 19H), 0.6 (t, 2H): $^{13}$C-NMR (ppm) 174.3, 58.2, 51.4, 34.0, 33.1, 29.3, 29.2, 29.1, 29.0, 24.9, 22.7, 18.2, 10.3; CG/MS (m/e) 348.2, 302, 249, 163, 119.

10-TES C10MEE-03 ($C_{23}H_{48}SiO_5$)(Compound 2): FTIR (cm$^{-1}$) 2973 (m), 1737 (m), 1104 (vs), 1079 (vs), 957 (m), 790 (m): $^1$H-NMR (ppm) 4.2 (t, 2H), 3.8 (q, 6H), 3.7 (m, 8H), 3.6 (t, 2H), 3.4 (s, 3H), 2.3 (t, 2H), 1.6 (m, 2H), 1.4-1.2 (m, 21H), 0.6 (t, 2H): $^{13}$C-NMR (ppm) 173.8, 71.9, 70.6, 70.6, 70.5, 69.2, 63.3, 59.0, 58.2, 34.2, 33.1, 29.3, 29.2, 29.1, 29.1, 28.7, 24.9, 22.7, 18.3, 10.3; CG/MS (m/e) 465.4, 434, 361, 317, 287, 243, 163, 103, 59.

10-TES C10 Glycidyl Ester ($C_{19}H_{38}SiO_6$)(Compound 3): FTIR (cm$^{-1}$) 2926 (m), 1742 (m), 1167 (m), 1103 (s), 1078 (vs), 956 (m), 789 (m): $^1$H-NMR (ppm) 4.4 (d of d, 1H), 3.9 (d of d, 1H), 3.8 (q, 6H), 3.2 (m, 1H), 2.8 (d of d, 1H), 2.6 (d of d, 1H), 2.4 (d of d, 1H), 1.6 (d of d, 2H), 1.4 (d of d, 2H), 1.2 (m, 20H), 0.6 (t, 2H): $^{13}$C-NMR (ppm) 173.4, 64.7, 58.2, 49.3, 44.5, 33.9, 33.0, 29.2, 29.1, 29.1, 29.0, 24.8, 22.6, 18.2, 10.3; CG/MS (m/e) 390.3, 347, 291, 243, 189, 163, 119.

10-TES C10 Fluoro Ester ($C_{22}H_{37}F_9SiO_4$)(Compound 4): FTIR (cm$^{-1}$) 2927 (m), 1746 (m), 1235 (s), 1222 (s), 1134 (s), 1104 (s), 1079 (vs), 957 (m), 791 (m): $^1$H-NMR (ppm) 4.4 (t, 2H), 3.8 (q, 6H), 2.5 (m, 2H), 2.3 (t, 2H), 1.6 (m, 2H), 1.4-1.2 (m, 21H), 0.63 (t, 2H); $^{13}$C-NMR (ppm) 173.3, 58.2, 56.0, 34.0, 33.1, 30.6, 30.4, 30.1, 29.2, 29.1, 29.1, 29.0, 24.7, 22.7, 18.2, 10.3; CG/MS (m/e) 534.3, 481, 317, 163, 119.

10-TES C10MEE-07 ($C_{31}H_{64}SiO_{12}$)(Compound 5): FTIR (cm$^{-1}$): 2925 (m) 2865 (m), 1737 (m), 1104 (vs), 1080 (vs), 956 (m), 791 (m): $^1$H-NMR (ppm) 4.2 (t, 2H), 3.8 (q, 6H), 3.7 (m, 24H), 3.6 (t, 2H), 3.4 (s, 3H), 2.3 (t, 2H), 1.6 (m, 2H), 1.4-1.2 (m, 21H), 0.63 (t, 2H): $^{13}$C-NMR (ppm) 173.8, 76.7, 71.9, 70.6, 70.5, 70.5, 69.1, 63.3, 59.0, 58.2, 34.1, 33.1, 29.3, 29.2, 29.1, 29.1, 24.8, 22.7, 18.3, 10.3; CG/MS (m/e) 359.2, 197, 103, 59, 45.

10-TES C10 DMAPA Amide: FTIR (cm$^{-1}$) 2926 (m), 1645 (s), 1542 (m), 1166 (m), 1103 (vs), 1079 (vs), 957 (s), 790 (s): $^1$H-NMR (ppm, DMSO-d$_6$) 7.6 (m, 1H), 3.7 (q, 6H), 3.0 (q. 2H), 2.2 (t, 2H), 2.1 (s, 6H), 2.0 (t, 2H), 1.5 (m, 4H), 1.3 (m, 13H), 1.1 (t, 9H).

10-TES C10 DMAPA Amide Quat ($C_{28}H_{53}ClN_2SiO_4$)(Compound 6): FTIR (cm$^{-1}$) 2926 (m), 1653 (s), 1103 (vs), 1078 (vs), 1003 (s), 955 (s), 783 (s), 730 (s), 704 (s): $^1$H-NMR (ppm, DMSO-d$_6$) 8.1 (m, 1H), 7.5 (m, 5H), 4.5 (m, 2H), 3.7 (q, 6H), 3.2 (m, 2H), 3.1 (q, 2H), 2.9 (s, 6H), 2.1 (t, 2H), 1.9 (m, 2H), 1.4 (m, 2H), 1.2-1.4 (m, 12H), 1.1 (t, 9H), 0.5, m, 2H).

Example 7: Performance Testing

Microscope Slide Treatment by the Experimental 10-TES Ester Derivatives to Form Surface Active Monolayers (SAMs):

Pre-cleaned, soda-lime glass microscope slides (Daigger Scientific, EF15975B, 25×75×1.0 mm, lot 59109056) were handled with nitrile gloves to avoid contamination. They were scored, broken in half, etched with a unique identifier, and placed into a plastic rack (VWR wash-n-dry coverslip rack, item 490007-150) so that the uncut, unmarked edge was facing up. The rack was immersed into a 1:1 methanol: 37 wt % aqueous solution of hydrochloric acid (4 oz), and gently stirred for 30-60 minutes. The rack was then removed and placed into deionized water (800 ml) with gentle stirring for 2 mins, removed, the rack patted dry, and placed under a nitrogen stream until dry (45 minutes).

The silane solution was prepared by adding a 95/5 wt % solution of ethanol/deionized water that had been acidified to a pH of 4.2 by acetic acid (97 g) and the silane (3.0 g) to a 4 oz jar. This was shaken, then gently stirred for 5 mins at room temperature before the dry, acid treated, rack of microscope slides were immersed. After 48 hours of gentle stirring at room temperature, the rack was removed and placed into absolute ethanol (8 oz) and gently stirred for 2 minutes. The rack was removed, patted dry, placed into a 60° C. oven for 4 hours, and then moved to a nitrogen stream overnight. The coated microscope slides were tested for their advancing contact angle (ACA) values by a tensiometer.
Determination of the Advancing Contact Angles (ACA) of the Experimental 10-TES Ester Derivatives Coated Microscope Slides:

A OneAttention Sigma 701 tensiometer was used to determine the ACA values for the silane-treated, self-assembled monolayer (SAM) coated microscope slide. Millipore water (25° C., surface tension between 71.5 to 72.5 dynes/cm, viscosity of 0.89 cP, and a density of 0.998 g/ml) was used to fill the vessel (150×70 mm). The slides were clamped, attached to the tensiometer, and tested at immersion/emersion rate of 5 mm/min. ACA measurements were taken at the start depth (2 mm) to the end depth (6.5 mm) over five cycles. The last four ACA values were averaged and its standard deviation reported. Finally, the surface tension of the Millipore water was re-tested and found to be essentially unchanged.

A set of three silanes were tested at one time: each silane having four coated microscope slides. The Momentive A-137 (octyltriethoxysilane) was used a reference for each series. The results are shown in Table 3.

TABLE 3

| Compound | Average ACA |
|---|---|
| 1 | 75.7 |
| 2 | 67.1 |
| 3 | 67.7 |
| 4 | 100.0 |
| 5 | 58.6 |
| A-137 | 86.2 |

What is claimed is:

1. A compound of formula (I):

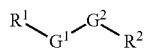
(I)

wherein:
G1 is —(CH2)9 or —(CH2)$_{11}$—;
G2 is C(O);
R1 is an organosilane moiety, wherein the organosilane moiety is a moiety of formula (II):

—Si(R11)(R12)(R13)    (II)

wherein:
R11, R12, and R13 are independently a hydrogen atom, a halogen atom, —OH, C1-12 alkyl, C6-14 aryl, C1-12 alkyloxy, or C6-14 aryloxy, wherein at least one of R11, R12, and R13 is C1-12 alkyl, C6-14 aryl, C1-12 alkyloxy, or C6-14 aryloxy;
R2 is NH—R4;
R4 is independently C2-12 alkenyl, or C1-101 heteroalkyl, each of which is optionally substituted one or more times by substituents selected independently from Rx, and
Rx is a halogen atom, —OH, —NH2, C1-6 alkyl, C2-6 alkenyl, C1-12 heteroalkyl, or C6-14 aryl, wherein any two-OH substituents on immediately adjacent carbon atoms may optionally combine to form an epoxy group.

2. The compound of claim 1, wherein G1 is —(CH2)9—.

3. The compound of claim 1, wherein each of R11, R12, and R13 is C1-12 alkyloxy.

4. The compound of claim 3, wherein each of R11, R12, and R13 is selected independently from the group consisting of: methoxy, ethoxy, isopropoxy, propoxy, butoxy, sec-butoxy, isobutoxy, and tert-butoxy.

5. The compound of claim 4, wherein each of R11, R12, and R13 is ethoxy.

6. A compound of formula (I):

(I)

wherein:
G1 is —(CH2)9 or —(CH2)$_{11}$—;
G2 is —CH2— or C(O);
R1 is an organosilane moiety, wherein the organosilane moiety is a moiety of formula (II):

—Si(R11)(R12)(R13)    (II)

wherein:
R11, R12, and R13 are independently a hydrogen atom, a halogen atom, —OH, C1-12 alkyl, C6-14 aryl, C1-12 alkyloxy, or C6-14 aryloxy, wherein at least one of R11, R12, and R13 is C1-12 alkyl, C6-14 aryl, C1-12 alkyloxy, or C6-14 aryloxy;
R2 is NH—R4;
wherein R4 is a moiety of formula (III):

-G3-N+(R21)(R22)-G4-R23    (III)

wherein:
G3 is C1-12 alkylene;
G4 is C1-6 alkylene;
R21 and R22 are independently a hydrogen atom or C1-20 alkyl; and
R23 is a hydrogen atom or a phenyl moiety.

* * * * *